(12) United States Patent
Mizusaki et al.

(10) Patent No.: US 11,168,254 B2
(45) Date of Patent: Nov. 9, 2021

(54) LIQUID CRYSTAL DISPLAY DEVICE AND PRODUCTION METHOD FOR LIQUID CRYSTAL DISPLAY DEVICE

(71) Applicant: SHARP KABUSHIKI KAISHA, Sakai (JP)

(72) Inventors: Masanobu Mizusaki, Sakai (JP); Tomonori Itoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 105 days.

(21) Appl. No.: 16/498,285

(22) PCT Filed: Mar. 22, 2018

(86) PCT No.: PCT/JP2018/011319
§ 371 (c)(1),
(2) Date: Jan. 13, 2020

(87) PCT Pub. No.: WO2018/180852
PCT Pub. Date: Oct. 4, 2018

(65) Prior Publication Data
US 2020/0199450 A1    Jun. 25, 2020

(30) Foreign Application Priority Data

Mar. 28, 2017  (JP) .............................. JP2017-063065

(51) Int. Cl.
| | |
|---|---|
| *G02F 1/1333* | (2006.01) |
| *C09K 19/34* | (2006.01) |
| *C09K 19/30* | (2006.01) |
| *C09K 19/56* | (2006.01) |
| *G02F 1/1337* | (2006.01) |
| *G02F 1/1339* | (2006.01) |
| *C09K 19/04* | (2006.01) |

(52) U.S. Cl.
CPC ...... *C09K 19/3402* (2013.01); *C09K 19/3003* (2013.01); *C09K 19/3066* (2013.01); *C09K 19/56* (2013.01); *G02F 1/1339* (2013.01); *G02F 1/133723* (2013.01); *G02F 1/133788* (2013.01); *C09K 2019/0448* (2013.01); *C09K 2019/0466* (2013.01); *C09K 2019/301* (2013.01); *C09K 2019/3004* (2013.01); *C09K 2019/3422* (2013.01); *C09K 2323/02* (2020.08)

(58) Field of Classification Search
CPC ............ C09K 19/3402; C09K 19/3003; C09K 19/3066; C09K 19/56; C09K 2323/02; C09K 2019/0448; C09K 2019/0466; C09K 2019/3004; C09K 2019/301; C09K 2019/3422; G02F 1/1333; G02F 1/1339; G02F 1/133723; G02F 1/133788
USPC .................................................... 252/299.01
See application file for complete search history.

(56) References Cited

U.S. PATENT DOCUMENTS

| | | |
|---|---|---|
| 2012/0021141 A1 | 1/2012 | Yoo et al. |
| 2015/0299576 A1 | 10/2015 | Fujita et al. |
| 2017/0090251 A1 | 3/2017 | Mizusaki et al. |
| 2020/0199450 A1* | 6/2020 | Mizusaki ............... C09K 19/56 |

FOREIGN PATENT DOCUMENTS

| | | |
|---|---|---|
| CN | 106164759 A | 11/2016 |
| JP | 2010-033093 A | 2/2010 |
| JP | 2015-205982 A | 11/2015 |

* cited by examiner

*Primary Examiner* — Geraldina Visconti
(74) *Attorney, Agent, or Firm* — ScienBiziP, P.C.

(57) ABSTRACT

The present invention is a liquid crystal display device including a liquid crystal layer containing a liquid crystal material, a sealing member surrounding the liquid crystal layer in a plan view, a pair of substrates sandwiching the liquid crystal layer, and an alignment control layer being in contact with the liquid crystal layer in a region surrounded by the sealing member in a plan view. The alignment control layer aligns a liquid crystal compound in the liquid crystal material in a direction horizontal to faces of the substrates, and contains a polymer formed by polymerization of at least one monomer, and the at least one monomer contains a monomer represented by the following Chemical formula (1):

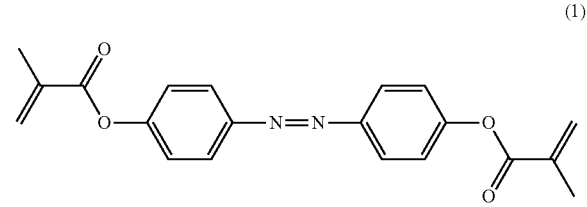

(1)

wherein at least one hydrogen atom of the phenylene group may be the same or different and may be substituted with a halogen atom, a methyl group, an ethyl group, or a propyl group.

12 Claims, 8 Drawing Sheets

Fig. 5
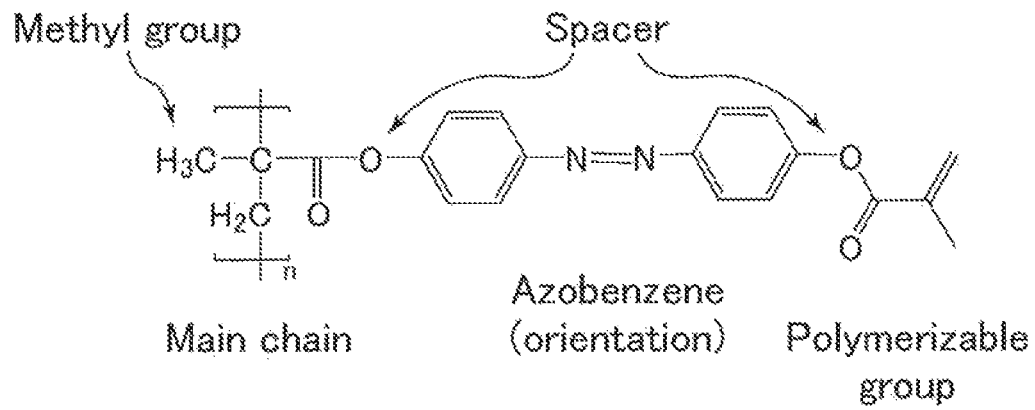
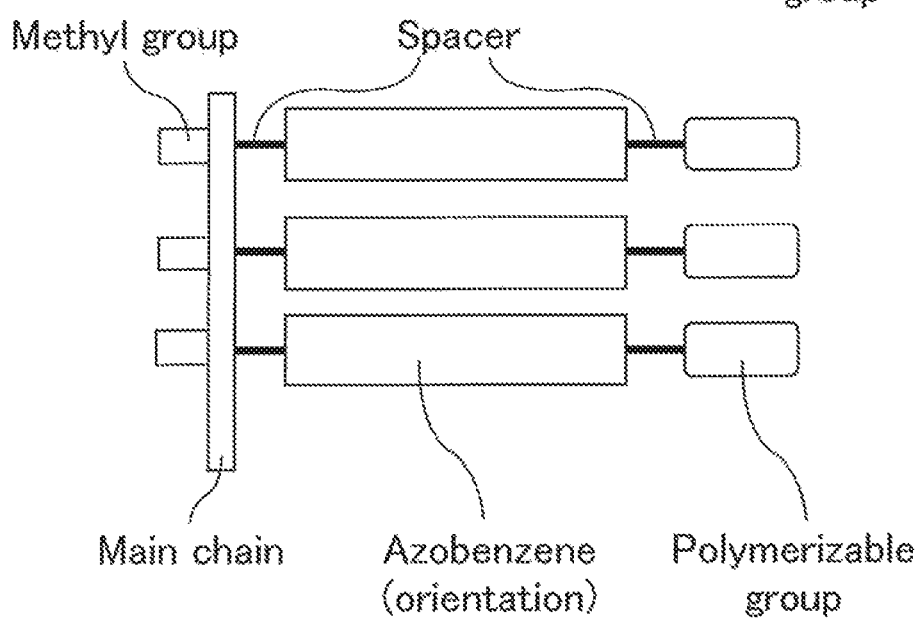
Fig. 6
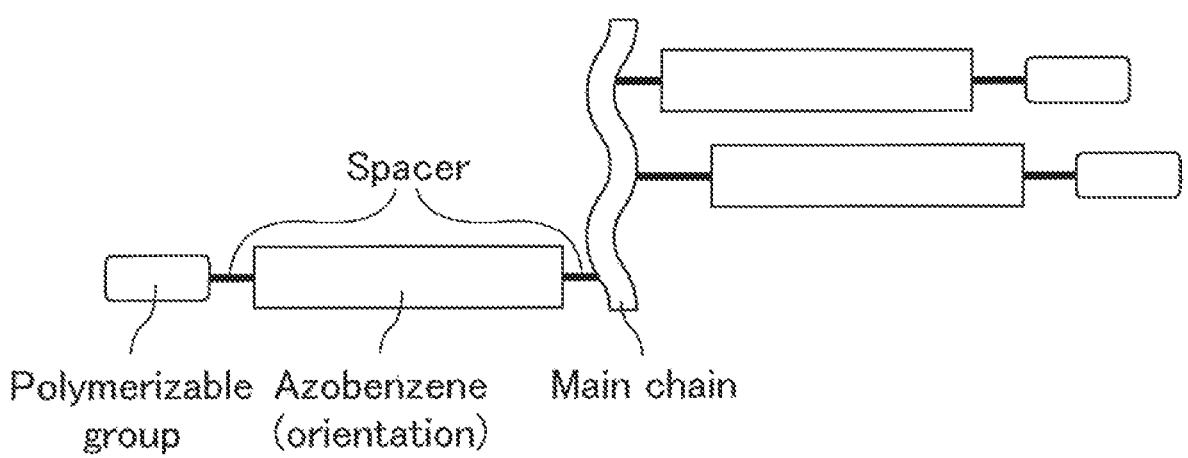

Fig. 8
(a)
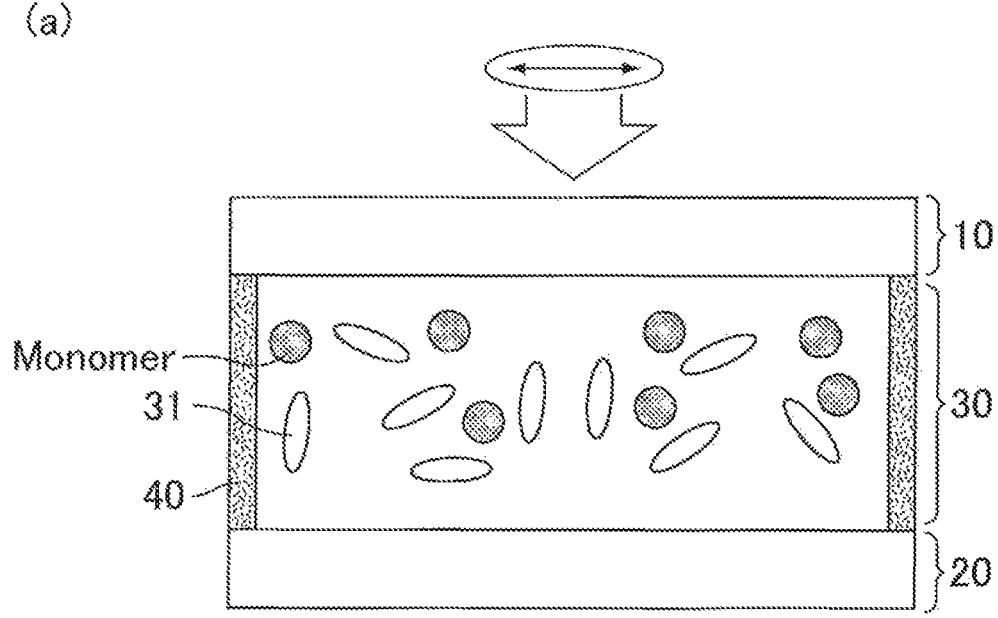
(b)
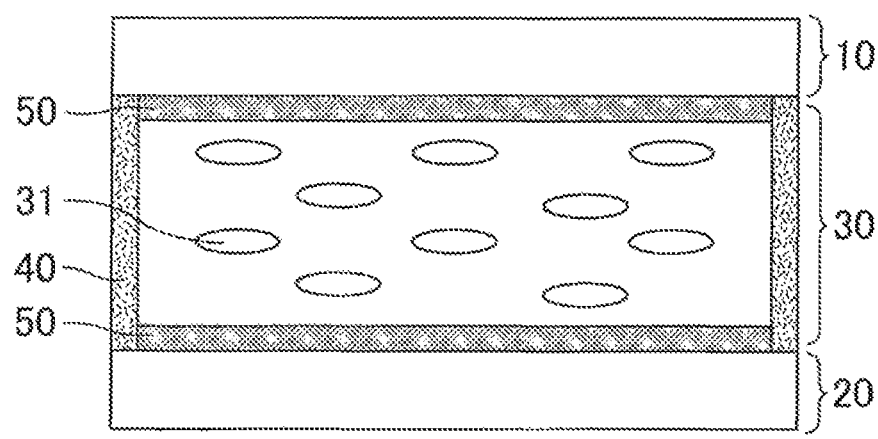

LIQUID CRYSTAL DISPLAY DEVICE AND PRODUCTION METHOD FOR LIQUID CRYSTAL DISPLAY DEVICE

TECHNICAL FIELD

The present invention relates to a liquid crystal display device and a production method for a liquid crystal display device. More specifically, the present invention relates to a liquid crystal display device having an alignment control layer and a production method for a liquid crystal display device.

BACKGROUND ART

Liquid crystal display devices are display devices that use liquid crystal compositions for display, and the typical display mode thereof is irradiating a liquid crystal panel containing a liquid crystal composition sealed between a pair of substrates with backlight and applying voltage to the liquid crystal composition to change the alignment of liquid crystal materials, thereby controlling an amount of light passing through the liquid crystal panel. Such liquid crystal display devices have features including a thin profile, light weight, and low power consumption, and have therefore been used for electronic devices such as smartphones, tablet PCs, and car navigation systems.

As another display method for liquid crystal display device, a transverse electric field display mode receives attention, for example, for ease of obtaining the wide viewing angle characteristic. In the transverse electric field display mode, control is performed by rotating the alignment of the liquid crystal material mainly in a plane parallel with faces of substrates. Examples of the transverse electric field display mode include an in-plane switching (IPS) mode, and a fringe field switching (FFS) mode.

In a liquid crystal display device, the alignment of liquid crystal materials with no voltage applied is typically controlled by alignment films having been subjected to an alignment treatment. The alignment film is formed, for example, by applying an alignment film material such as polyamic acid on a substrate, followed by baking. As another method for controlling alignment of a liquid crystal material, a polymer sustained alignment technique (hereinafter, also referred to PSA technique) in which a polymerizable monomer added into the liquid crystal layer is polymerized to form a polymer layer that controls alignment of the liquid crystal material on a face of the alignment film has been investigated (see, for example, Patent Literatures 1 to 3). Further, controlling alignment of a liquid crystal material by the polymer layer without forming a conventional alignment film has also been investigated (see, for example, Patent Literatures 1 and 2).

CITATION LIST

Patent Literature

Patent Literature 1: JP 2015-205982 A
Patent Literature 2: JP 2010-033093 A
Patent Literature 3: US 2012/0021141 A1

SUMMARY OF INVENTION

Technical Problem

In recent years, a liquid crystal display device tends to have a broader display area, and this requires narrowing the frame area. A display area means an area where an image recognized by an observer is displayed, and does not include a frame area. In the frame area, for example, a gate driver, a source driver, and a display control circuit are accommodated. As one method for narrowing the frame area, narrowing the area of the sealing member for pasting a pair of substrates together has been examined; however, narrowing the width of the sealing member can deteriorate the peel strength between the substrates and cause peeling.

The present invention has been made in view of such a current state of the art and aims to provide a liquid crystal display device capable of increasing peel strength between substrates, and a production method for a liquid crystal display device capable of producing such a liquid crystal display device.

Solution to Problem

In order to respond to a narrowed frame of a liquid crystal display device, the present inventors investigated narrowing the width of the sealing member that pastes a pair of substrates together. The present inventors have found that a liquid crystal display device having a conventional photo-alignment film or a vertical alignment film is prone to peel at an interface between an alignment film and a sealing member. This is because substrates are pasted together by the sealing member to form the liquid crystal layer after alignment films are formed on faces of substrates, and the sealing member and each of the substrates are intervened by the alignment film, and the adhesive strength between the sealing member and the alignment film is poor. The reason why the adhesive strength between the sealing member and the photo-alignment film or the vertical alignment film is poor is that while faces of the photo-alignment film and the vertical alignment film are hydrophobic, a resin contained in the sealing member is slightly hydrophilic, and they have low affinity.

The present inventors have found that by disposing an alignment control layer so as to be in contact with the liquid crystal layer in a region surrounded by the sealing member in a plan view in place of a conventional alignment film, it is possible to control alignment of the liquid crystal material without necessity of forming a conventional alignment film on a face of substrate. The present inventors have found that a sufficient peel strength can be obtained even when the width of the sealing member is narrowed because the pair of substrates can be bonded to each other in such a manner that each of the substrates is in contact with the sealing member while the substrate and the sealing member are not intervened by an alignment film.

Further, the present inventors have found that by using a monomer containing an azobenzene group as a material for an alignment control layer that aligns a liquid crystal material in the direction horizontal to faces of substrates, it is possible to polymerize monomer with a polarized ultraviolet ray, so that it is possible to form an alignment control layer with lower radiation intensity compared with irradiation with unpolarized light. The present inventors have conceived that by lowering the intensity of the light applied to the liquid crystal layer, decomposition of the liquid crystal material is less likely to occur, and accomplished the present invention.

One aspect of the present invention may be a liquid crystal display device including a liquid crystal layer containing a liquid crystal material, a sealing member surrounding the liquid crystal layer in a plan view, a pair of substrates sandwiching the liquid crystal layer, and an alignment control layer being in contact with the liquid crystal layer in a region surrounded by the sealing member in a plan view. In this liquid crystal display device, the alignment control layer aligns a liquid crystal compound in the liquid crystal material in a direction horizontal to faces of the substrates, and contains a polymer formed by polymerization of at least one monomer, and the at least one monomer contains a monomer represented by the following Chemical formula (1):

[Chem. 1]

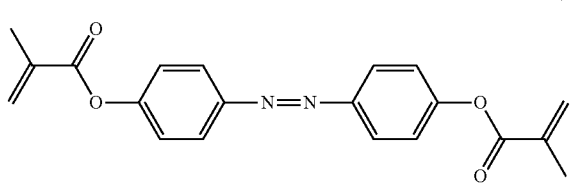

(1)

(wherein at least one hydrogen atom of the phenylene group may be the same or different and may be substituted with a halogen atom, a methyl group, an ethyl group, or a propyl group.)

Another aspect of the present invention may be a production method for a liquid crystal display device, including sealing a liquid crystal composition containing a liquid crystal material and at least one monomer between a pair of substrates bonded to each other by a sealing member to form a liquid crystal layer, and irradiating the liquid crystal layer with a polarized ultraviolet ray to form an alignment control layer by polymerization of the at least one monomer between the liquid crystal layer and each of the pair of substrates. In this production method, the at least one monomer contains a monomer represented by the following Chemical formula (1), and the alignment control layer aligns a liquid crystal compound in the liquid crystal material in a direction horizontal to faces of the substrates,

[Chem. 2]

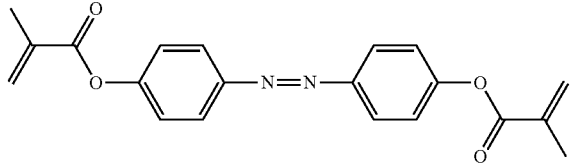

(1)

(wherein at least one hydrogen atom of the phenylene group may be the same or different and may be substituted with a halogen atom, a methyl group, an ethyl group, or a propyl group.)

Patent Literature 1 discloses a liquid crystal composition containing an alignment control material that is highly compatible to other liquid crystal composition, and having excellent alignment restraining force, and discloses forming an alignment control layer by polymerizing a polymerizable compound contained in the liquid crystal composition. Patent Literature 2 discloses polymerizing a multifunctional monomer having a symmetric structure, mixed into the liquid crystal, and vertically aligning the liquid crystal by the obtained ultraviolet cured product. Patent Literature 3 discloses a composition for alignment of liquid crystal containing a norbornene polymer having photo-reactivity, a binder, a reactive mesogen, and a photo initiator.

However, all of Patent Literatures 1 to 3 lack concrete disclosure about a monomer having an azobenzene group represented by Chemical formula (1), and fail to investigate irradiating the monomer having an azobenzene group with polarized ultraviolet rays. In Patent Literature 2, liquid crystal is vertically aligned by an ultraviolet-cured product. However, the liquid crystal display device of the present invention differs from Patent Literature 2 in that the liquid crystal display device has an alignment control layer for aligning the liquid crystal material in the direction horizontal to faces of substrates. Patent Literature 3 discloses a liquid crystal display device having an alignment film, and therefore, it is considered that peeling is likely to occur when the width of the sealing member is narrowed.

Advantageous Effects of Invention

According to the liquid crystal display device of the present invention and the production method for the liquid crystal display device, it is possible to increase the peel strength between the substrates.

2 is a schematic plan view of the liquid crystal display device according to Embodiment 1.

Figure 3:
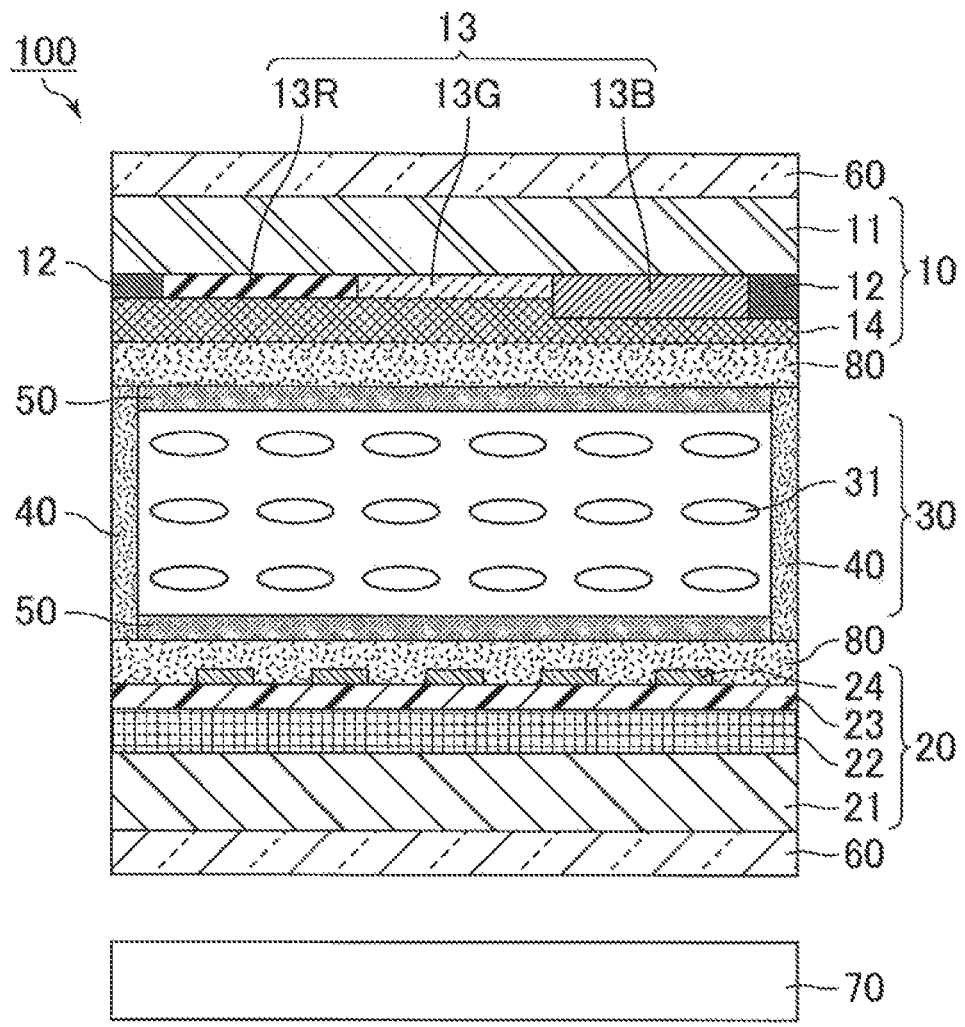

FIG. 3 is a schematic cross-sectional view of a liquid crystal display device according to a modification of Embodiment 1.

Figure 4:
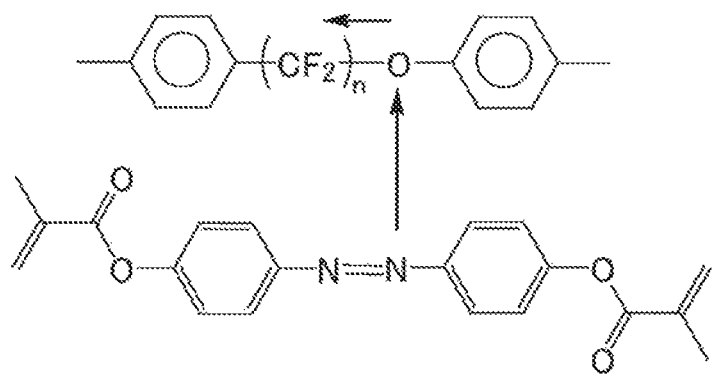

FIG. 4 is a view showing liquid crystal molecules having a —(CF2)n-O— group and a monomer having an azobenzene group, which are included in a liquid crystal material of the liquid crystal display device of Embodiment 1.

FIG. 5 is a chemical formula and schematic diagram showing a state in which the monomer having an azobenzene group according to Embodiment 1 is polymerized by irradiation with polarized ultraviolet rays.

FIG. 6 is a schematic diagram showing a state in which a monomer having an azobenzene group according to Comparative Embodiment 1 is polymerized by irradiation with polarized ultraviolet rays.

Figure 7:
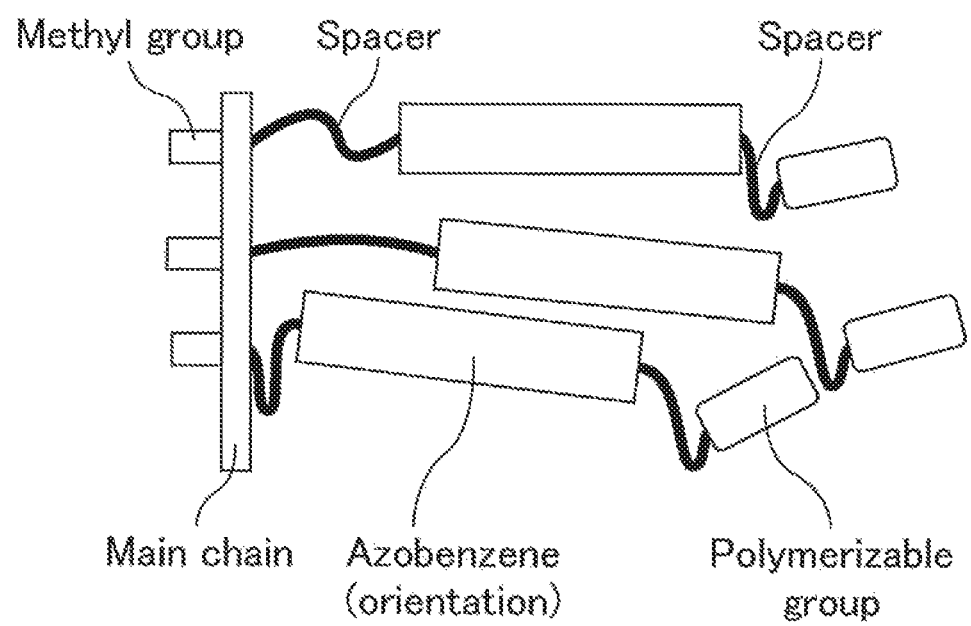

FIG. 7 is a schematic diagram showing a state in which a monomer having an azobenzene group according to Comparative Embodiment 2 is polymerized by irradiation with polarized ultraviolet rays.

FIG. 8 is a schematic diagram showing the course of forming an alignment control layer in a production method for the liquid crystal display device of Embodiment 1, in which FIG. 8(a) shows monomers before polymerization, and FIG. 8(b) shows monomers after polymerization.

Figure 9:
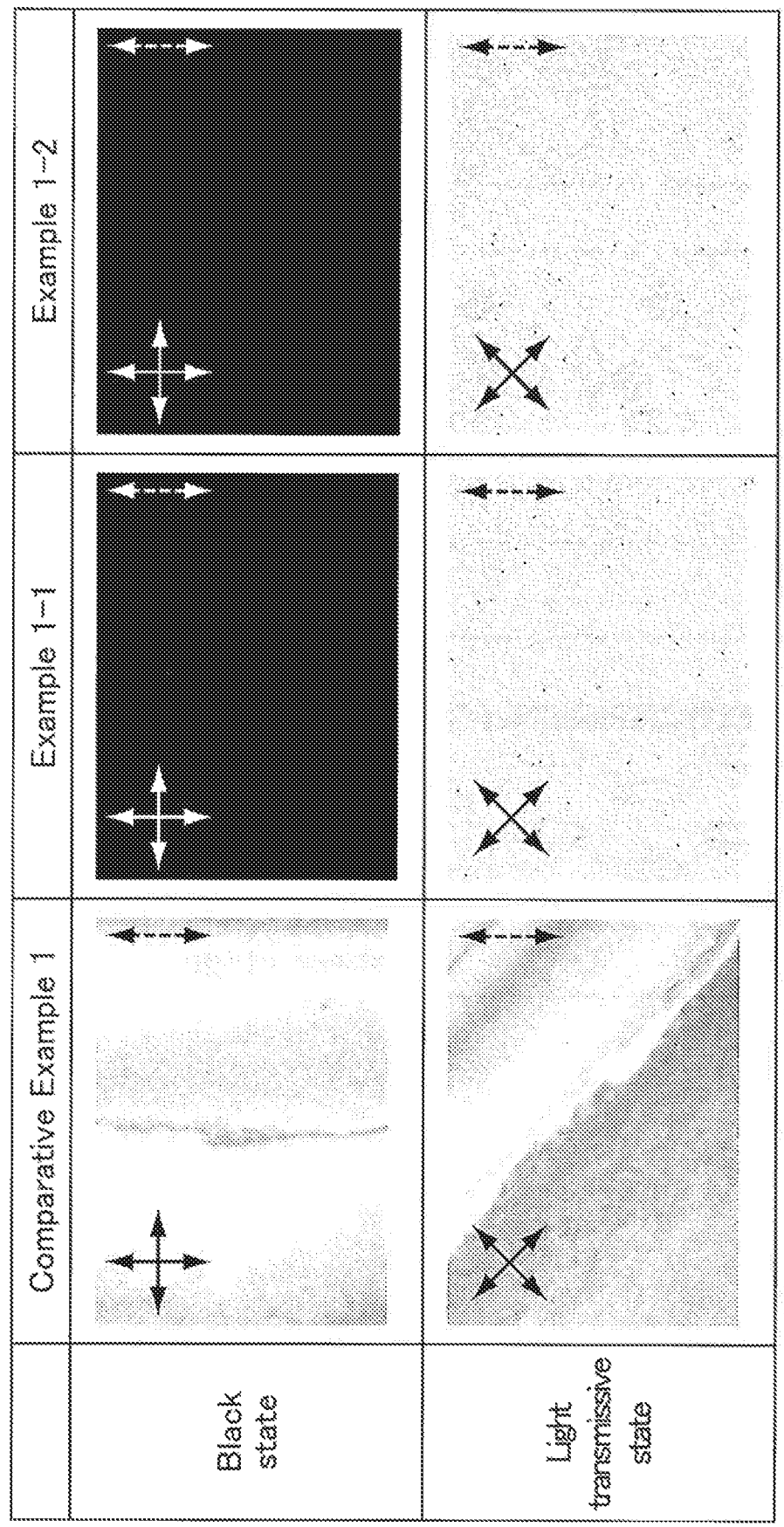

FIG. 9 is a table summarizing results of observations of a black state and a light, transmissive state of Examples 1-1 and 1-2 and Comparative Example 1.

Figure 10:
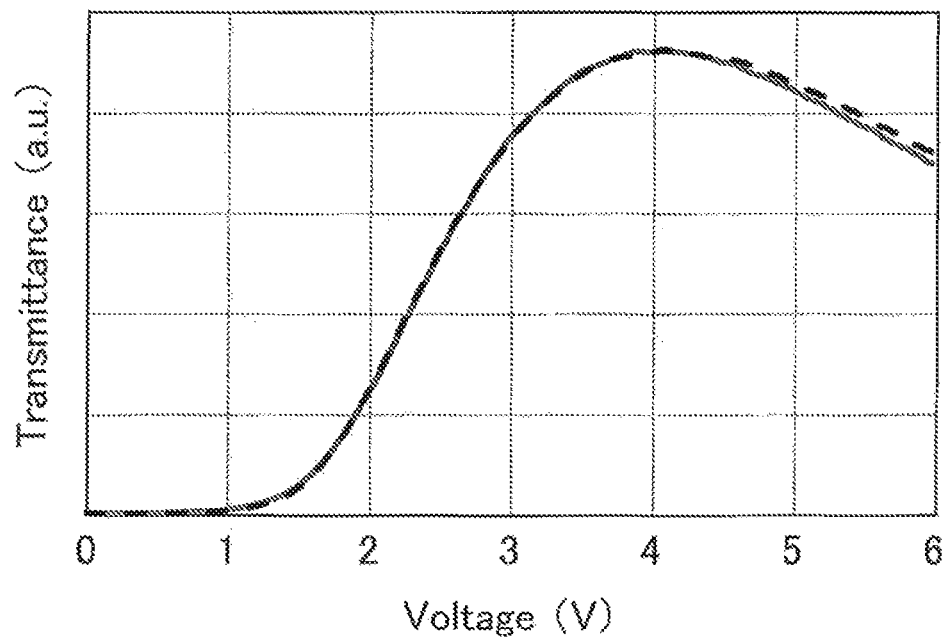

FIG. 10 is a graph showing VT characteristics of Example 1-2 and Comparative Example 3.

Figure 11:
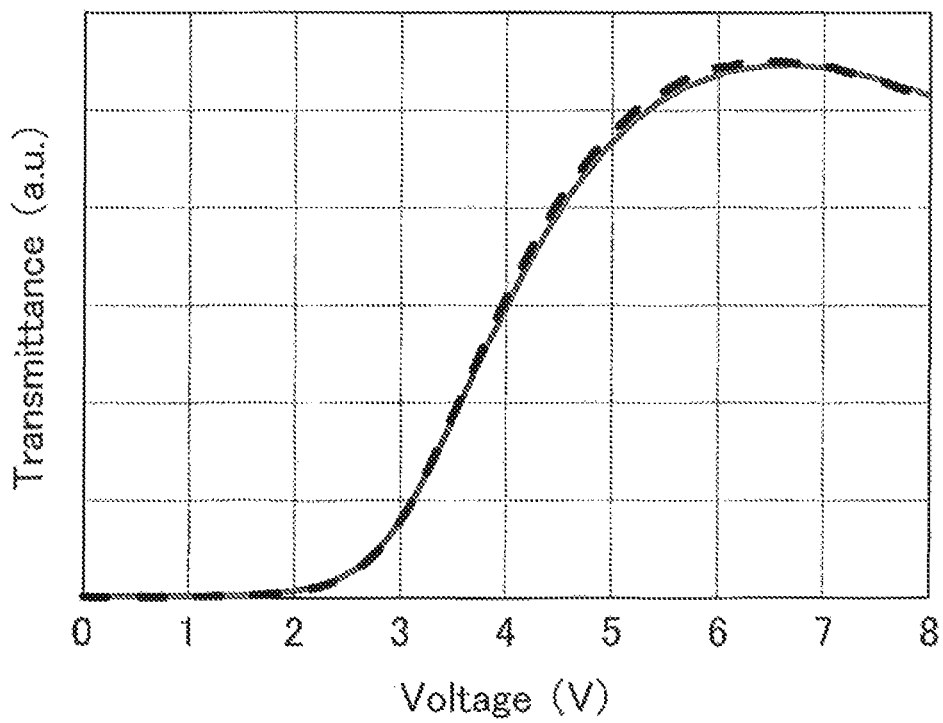

FIG. 11 is a graph showing VT characteristics of Example 2 and Comparative Example 5.

Figure 12:
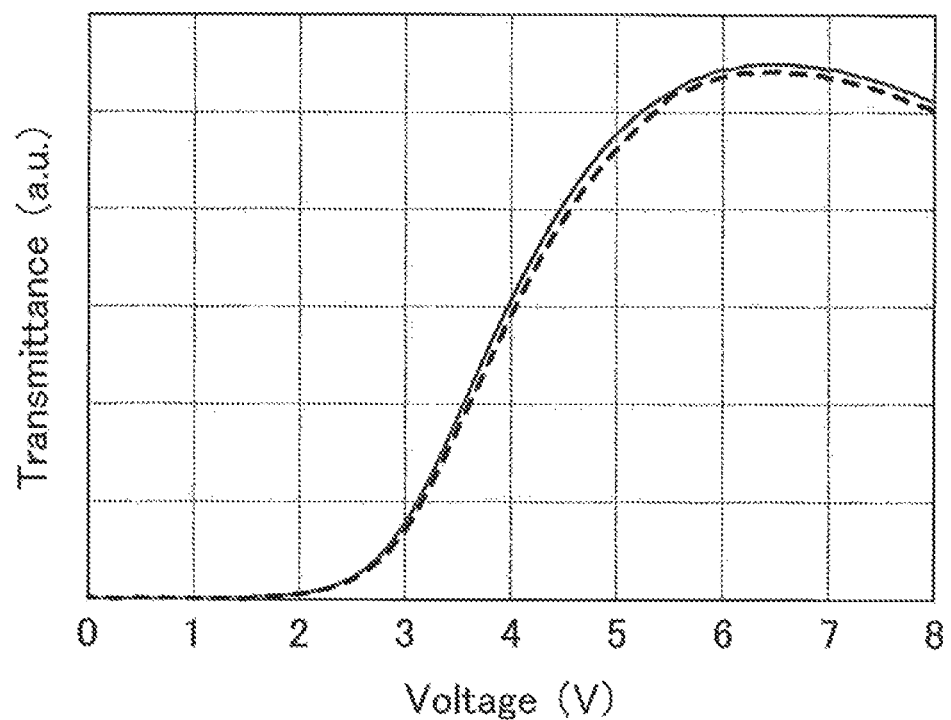

FIG. 12 is a graph showing VT characteristics of Example 2 and Example 3.

Figure 13:
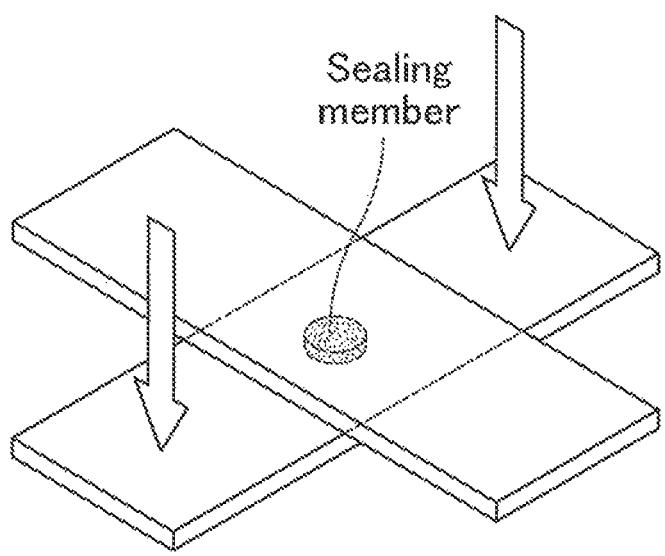

FIG. 13 is a schematic view of a sample for evaluation of adhesive strength.

DESCRIPTION OF EMBODIMENTS

Hereinafter, embodiments of the present invention will be described. The present invention is not limited to the contents described in the following embodiments, but can be appropriately modified in design within the range that satisfies the configuration of the present invention.

EMBODIMENT 1

<Liquid Crystal Display Device>

Figure 1:
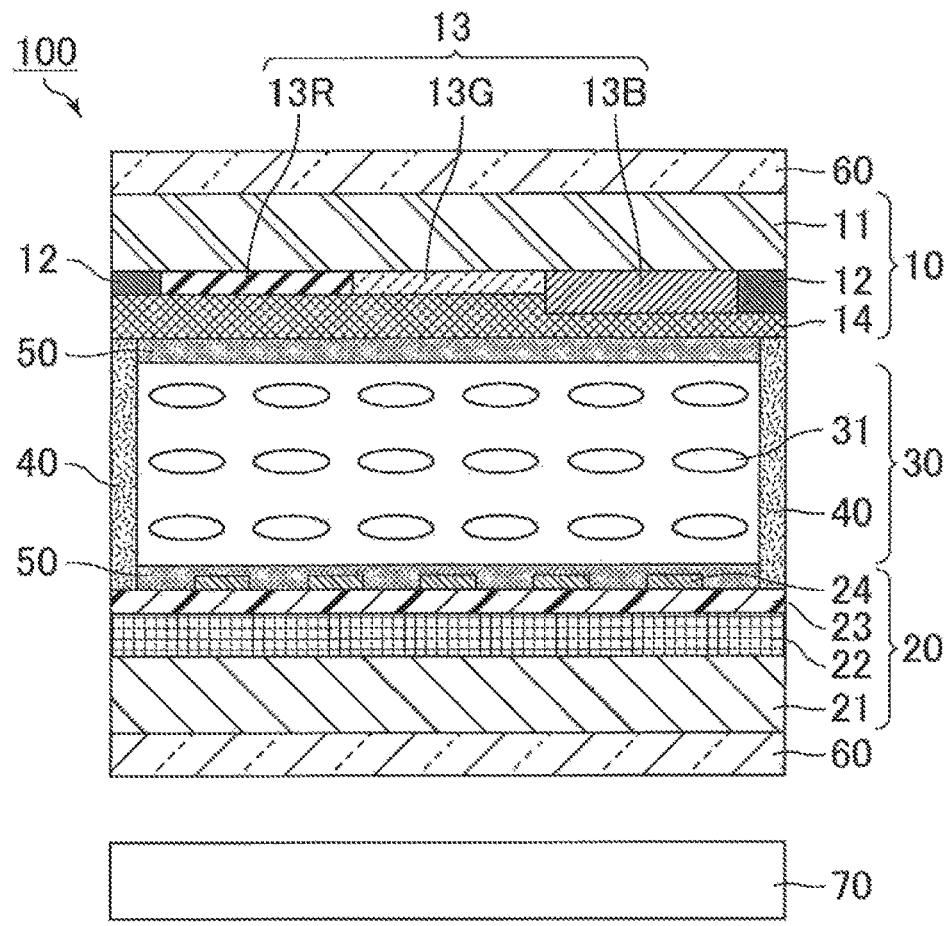
FIG. 1 is a schematic cross-sectional view of a liquid crystal display device according to Embodiment 1.
Figure 2:
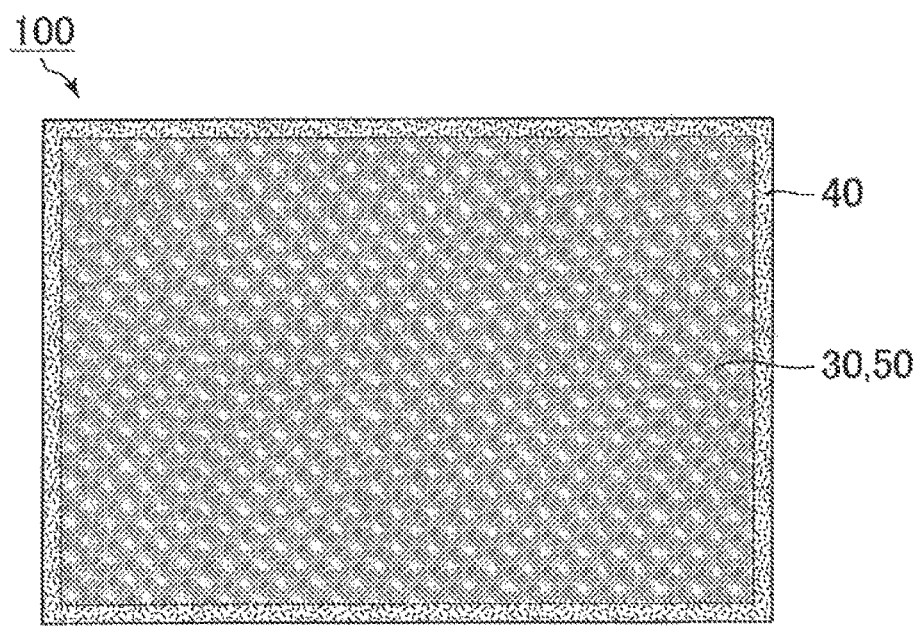

First, referring to FIGS. 1 to 3, a liquid crystal display device of Embodiment 1 is described. FIG. 1 is a schematic cross-sectional view of the liquid crystal display device according to Embodiment 1. FIG. 2 is a schematic plan view of the liquid crystal display device according to Embodiment 1. As shown in FIGS. 1 and 2, a liquid crystal display device 100 of the present embodiment includes a liquid crystal layer 30 containing a liquid crystal material, a sealing member 40 surrounding the liquid crystal layer 30 in a plan view, a pair of substrates 10 and 20 that are bonded to each other by the sealing member 40 to sandwich the liquid crystal layer 30, and an alignment control layer 50 being in contact with the liquid crystal layer 30 in a region surrounded by the sealing member 40 in a plan view. The liquid crystal display device 100 further includes a backlight 70 on the back of either one of the pair of substrates 10 and 20.

The liquid crystal display device 100 of the present embodiment may not have a conventional alignment film on faces of sides toward liquid crystal layer 30 of the pair of substrates 10 and 20, and the pair of substrates 10 and 20 are bonded to each other by the sealing member 40. Since the substrates 10 and 20, and the sealing member 40 are in contact with each other without intervention by a conventional alignment film, it is possible to improve the peeling strength, and it is possible to keep the adhesion between the pair of substrates 10 and 20 even when the width of the sealing member 40 is reduced for narrowing the frame area. In this case, while the alignment film is required not to be formed in a position overlapping with the sealing member 40 in a plan view, preferably, the alignment film is not formed on the whole faces of the pair of substrates 10 and 20 because it is difficult not to form an alignment film only in a position overlapping with the sealing member 40 in terms of the accuracy of the printing device used for formation of the alignment film. In the present invention, "alignment film" means a monolayer film or a multilayer film composed of polyimide, polyamic acid, polyamide, polymaleimide, polysiloxane, polysilsesquioxane, polyphosphazene, or a copolymer thereof, or a film of a silicon oxide formed by oblique deposition, capable of controlling alignment of a liquid crystal material. In a general liquid crystal display device, an alignment film is formed by directly applying (applying, for example, polyimide or the like) or vapor depositing (for example, oblique deposition of a silicon oxide (SiO)) an alignment film material on faces of substrates constituting a display area. The alignment film is not limited to those having undergone an alignment treatment as long as an existing alignment film material such as polyimide is applied.

FIG. 3 is a schematic cross-sectional view of a liquid crystal display device according to a modification of Embodiment 1. As shown in FIG. 3, in the present embodiment, from the viewpoint of long-term reliability, an alignment film containing polyimide (hereinafter also referred to as a polyimide-based alignment film) 80 may be provided between the alignment control layer 50 and at least one of the pair of substrates 10 and 20. The polyimide-based alignment film 80 may have undergone an alignment treatment or may not have undergone the alignment treatment. The polyimide-based alignment film 80 may align the liquid crystal compound in a desired direction and, for example, may align the liquid crystal compound uniformly in a predetermined direction. Alternatively, the polyimide-based alignment film 80 may not align the liquid crystal compound in the desired direction and, for example, may not uniformly but randomly align the liquid crystal compound. However, from the viewpoint of reliably increasing the peel strength between the substrates 10 and 20, it is preferable that an alignment film including a polyimide-based alignment film be not provided between the alignment control layer 50 and at least one of the substrates 10 or 20 (more preferably, each of the substrates 10 and 20).

Examples of the pair of substrates 10 and 20 include a combination of an active matrix substrate (TFT substrate) and a color filter (CF) substrate.

As the active matrix substrate, those generally used in the field of liquid crystal display device may be used. In one exemplary configuration of the active matrix substrate in a plan view, on a transparent substrate 21, multiple gate signal lines that are parallel with each other; multiple source signal lines that extend in the direction orthogonal to the gate signal lines, and are parallel with each other; active elements such as thin-film transistors (TFT) that are arranged in correspondence with cross-points between the gate signal lines and the source signal lines; pixel electrodes 24 that are arranged in a matrix state in regions partitioned by the gate signal lines and the source signal lines and so on are disposed. In the case of a transverse electric field display mode, a common line, a common electrode 22 connected to the common line, and so on are further provided. The pixel electrode 24 and the common electrode 22 may be stacked with an insulating layer 23 interposed therebetween. As the TFT, those having channels formed of amorphous silicon, polysilicon, or IGZO (indium-gallium-zinc-oxygen) which is an oxide semiconductor are preferably used.

In a display method or active matrix type, generally, a signal voltage is applied on an electrode through a TFT when a TFT provided for each pixel is ON, and an electric charge charged in the pixel at this time is retained in the period in which the TFT is OFF. The ratio of charged electric charges retained in one frame period (for example, 16.7 ms) is indicated by a voltage holding ratio (VHR). In other words, lower VHR means higher probability of attenuation in the voltage applied to the liquid crystal layer with time, and in the display method of active matrix type, it is required to make VHR high.

As the color filter substrate, those generally used in the field of liquid crystal display device may be used. In one exemplary configuration of the color filter substrate, on a transparent substrate 11, a black matrix 12 is formed into a grid pattern, and a color filter 13 or the like formed inside the grid, namely inside the pixel is provided. The color filter 13 may include a red color filter 13R, a green color filter 13G and a blue color filter 13B. The blue color filter 13B may have a larger thickness than the red color filter 13R or the green color filter 13G. By making the thickness of the blue color filter 13B large, it is possible to reduce the thickness of the liquid crystal layer and to optimize the thickness of the cell. On a face of the color filter 13, an over coat layer 14 (dielectric constant ε=3 to 4) for flattening the bumpy face may be disposed. When the color filter substrate has the over coat layer 14, the peel strength of the sealing member does not deteriorate although the over coat layer 14 and the sealing member 40 are in contact with each other.

In the pair of substrates 10 and 20, both the color filter and the active matrix may be formed on either one of the substrates.

As shown in FIG. 2, the sealing member 40 is surrounding the periphery of the liquid crystal layer 30 in a plan view. The sealing member 40 may be cured by light such as ultraviolet rays, or may be cured by heat, or may be cured by both light and heat. The sealing member 40 may contain an epoxy resin or a (meth)acryl resin, for example. The sealing member 40 may contain an inorganic filler, an organic filler or a curing agent. As the sealing member 40, for example, Photolec available from Sekisui Chemical Co., Ltd. may be used.

The sealing member 40 may have a width in a plan view of 0.4 mm or more and 5 mm or less. A more preferred lower limit of the width of the sealing member 40 is 0.6 mm, and a more preferred upper limit is 4 mm, and a further preferred upper limit is 2 mm. The width of the sealing member 40 may be 1.0 mm or less. The substrate 10 and the substrate 20 can be bonded to each other sufficiently even with a width as small as 1.0 mm or less because in the liquid crystal display device 100 of the present embodiment, the substrates 10 and 20, and the sealing member 40 can be in direct contact with each other.

The liquid crystal layer 30 contains a liquid crystal material containing at least one type of the liquid crystal compound (liquid crystal molecule) 31. The liquid crystal material is thermotropic liquid crystal, and is preferably, a liquid crystal material exhibiting a nematic phase (nematic liquid crystal). The liquid crystal material is preferably the one of which phase transits to the isotropic phase from the nematic phase at a certain critical temperature (nematic phase-isotropic phase transition point ($T_{NI}$)) or higher as the temperature is elevated. It is preferred that the liquid crystal layer 30 exhibits a nematic phase under a service environment (for example, −40° C. to 90° C.) of the liquid crystal display device. Examples of the temperature of the nematic phase-isotropic phase transition point of the liquid crystal material include, but are not limited to, 70° C. to 110° C. The aforementioned $T_{NI}$ is $T_{NI}$ of the liquid crystal material containing the liquid crystal before the monomer represented by the following Chemical formula (1) as will be described later is added.

The aforementioned liquid crystal material and the liquid crystal compound 31 may have negative or positive value for the anisotropy of dielectric constant (Δε) defined by the formula below. In other words, the liquid crystal material and the liquid crystal compound 31 may have negative anisotropy of dielectric constant or positive anisotropy of dielectric constant. As the liquid crystal material having negative anisotropy of dielectric constant, for example, those having Δε of −1 to −20 can be used. As the liquid crystal material having positive anisotropy of dielectric constant, for example, those having Δε of 1 to 20 can be used. Further, the liquid crystal layer 30 and the liquid crystal material may contain a liquid crystal compound not having polarity, namely a liquid crystal compound having Δε of substantially 0 (neutral liquid crystal compound). Examples of the neutral liquid crystal compound include a liquid crystal compound having an alkene structure. Hereinafter, a liquid crystal material and a liquid crystal compound having positive anisotropy of dielectric constant are also referred to as a positive liquid crystal material and a positive liquid crystal compound, respectively.

Δε=(dielectric constant in the major axis direction)−(dielectric constant in the minor axis direction)

As will be described later, the alignment control layer 50 is formed by polymerization of a monomer represented by the following Chemical formula (1) (hereinafter also referred to as the monomer (1)) dissolved in a liquid crystal material. From the viewpoint of solubility of the monomer (1), the liquid crystal material is preferably a positive liquid crystal material and preferably contains a positive liquid crystal compound. Unlike a general liquid crystal compound (or liquid crystal material), the azobenzene group contained in the monomer (1) has a nitrogen group (azo group —N═N—), so that the monomer (1) has a low affinity with the general liquid crystal compound (or liquid crystal material), and the solubility of the monomer (1) in the general liquid crystal material is low. However, a liquid crystal compound having a —(CF$_2$)$_n$—O— group (n is 1, 2 or 3) to be described later, which has a high affinity with the monomer (1) and can contribute to improving the solubility of the monomer (1) in the liquid crystal material is widely used for positive liquid crystal materials but is not very versatile for liquid crystal materials having negative anisotropy of dielectric constant. Accordingly, a positive liquid crystal material is suitable as the liquid crystal material. Since the —O— group and —F group are highly polar, the affinity with the azo group (or azobenzene group) is relatively good, and the monomer (1) can be dissolved in a liquid crystal material containing a liquid crystal compound having such a group. Furthermore, since the positive liquid crystal compound and the positive liquid crystal material exhibit high light resistance, there is almost no decrease in the voltage holding ratio even when the monomer (1) is irradiated with ultraviolet rays. Therefore, a combination of the monomer (1) with a positive liquid crystal compound and a positive liquid crystal material is preferable. In addition, positive liquid crystal compounds have characteristics such as high $T_{NI}$ and high-speed response (low rotational viscosity).

[Chem. 3]

(1)

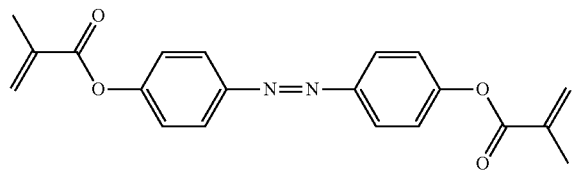

(wherein at least one hydrogen atom of the phenylene group may be the same or different and may be substituted with a halogen atom, a methyl group, an ethyl group, or a propyl group.)

As described above, preferable examples of the liquid crystal compound include a liquid crystal compound having a —(CF$_2$)$_n$—O— group (n is 1, 2 or 3). More specifically, a liquid crystal compound (hereinafter also referred to as the liquid crystal compound (2)) including a structure represented by the following Chemical formula (2) and a liquid crystal compound (hereinafter also referred to as the liquid crystal compound (3)) including a structure represented by the following Chemical formula (3) are preferable. The liquid crystal material preferably contains at least one of the liquid crystal compound (2) or (3). The liquid crystal material may contain one or two or more liquid crystal compounds (2), or one or two or more liquid crystal compounds (3).

[Chem. 4]

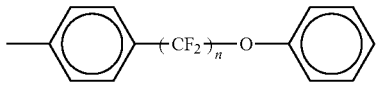

(2)

(wherein at least one hydrogen atom of a benzene ring may be substituted with a halogen atom, and n is an integer of 1 to 3.)

[Chem. 5]

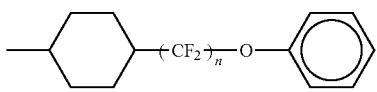

(3)

(wherein at least one hydrogen atom of the benzene ring and the cyclohexane ring may be substituted with a halogen atom, and n is an integer of 1 to 3.)

The reason why the liquid crystal compounds (2) and (3) are preferable as the liquid crystal compounds will be described with reference to FIG. 4. FIG. A is a view showing liquid crystal molecules having a —(CF$_2$)$_n$—O— group and a monomer having an azobenzene group, which are included in a liquid crystal material of the liquid crystal display device of Embodiment 1. First, when the liquid crystal material contains a liquid crystal compound having the above skeleton, the anisotropy of dielectric constant of the liquid crystal material can be made positive. As shown in FIG. 4, when two fluorine atoms and one oxygen atom are bonded to a carbon atom, electron nucleophilicity of the carbon atom is improved, and the carbon atom becomes highly polar. On the other hand, an unpaired electron of the oxygen atom in the —(CF$_2$)$_n$—O— group is withdrawn by the —(CF$_2$)— group, and the electron density of the —O— group becomes low. Thus, the —O— group pulls an unpaired electron of the azo group (—N=). As a result, the affinity between the liquid crystal compound having the above skeleton and the monomer (1) having an azo group (including N) is improved, and the monomer (1) is easily dissolved in the liquid crystal material.

The liquid crystal compound (2) is preferably a compound represented by any one of the following Chemical formulas (2-1) to (2-3), and the liquid crystal compound (3) is preferably a compound represented by any one of the following Chemical formulas (3-1) to (3-4).

[Chem. 6]

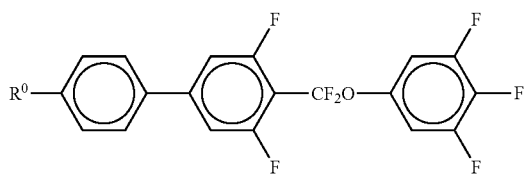

(2-1)

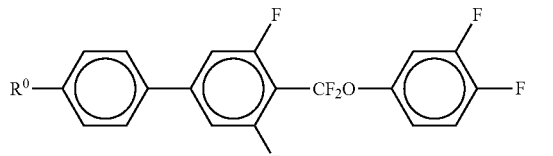

(2-2)

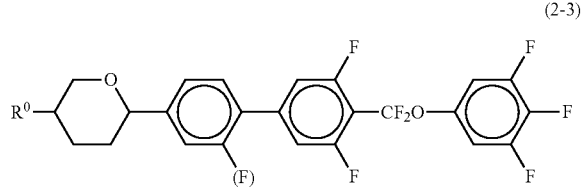

(2-3)

(wherein R$^0$ is a saturated alkyl group containing 1 to 12 carbon atoms.)

[Chem. 7]

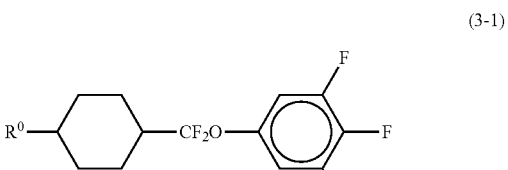

(3-1)

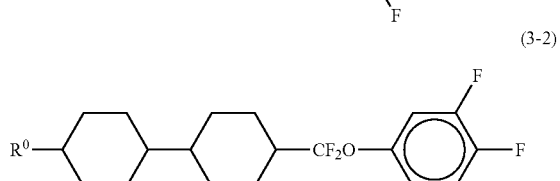

(3-2)

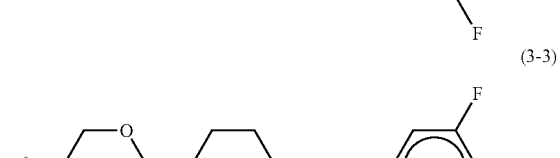

(3-3)

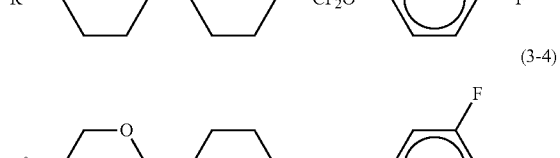

(3-4)

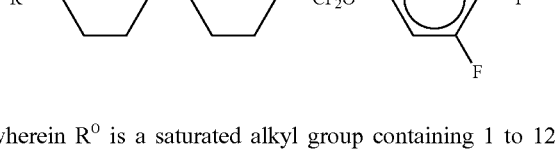

(wherein R$^0$ is a saturated alkyl group containing 1 to 12 carbon atoms.)

The liquid crystal material may contain a liquid crystal compound containing an alkenyl group. The liquid crystal compound containing an alkenyl group is preferably a neutral liquid crystal compound. By containing the liquid crystal compound containing an alkenyl group, rotational viscosity of the liquid crystal material is improved, so that it is possible to improve the responsibility of the liquid crystal material, and to improve the speed. On the other hand, the liquid crystal compound containing an alkenyl group has low light resistance and may be decomposed by irradiation with ultraviolet rays or the like to cause a decrease in VHR. Thus, in a vertical alignment type alignment film-less mode that irradiates unpolarized light and the conventional PSA technique, when a liquid crystal compound containing an alkenyl group that has a problem in light resistance is used, this causes a significant decrease in VHR. On the other hand, in the present embodiment, the alignment control layer 50 contains a polymer formed by polymerization of the monomer (1), and the monomer (1) has an azobenzene group and expresses an alignment restraining force by polarized ultraviolet rays which are the ultraviolet light only in a uniaxial direction. Therefore, it is possible to largely reduce the intensity of the ultraviolet rays applied to the liquid crystal layer 30 as compared with unpolarized light. Even if the liquid crystal material includes a positive liquid crystal compound, the positive liquid crystal compound exhibits high light resistance as described above. Thus, even if the liquid crystal compound containing an alkenyl group is introduced into the liquid crystal material, reliability problems such as a decrease in VHR are unlikely to occur.

The liquid crystal compound containing an alkenyl group may be a compound represented by any one of the following Chemical formulas (4-1) to (4-4).

[Chem. 8]

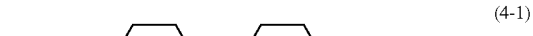

(4-1)

(4-2)

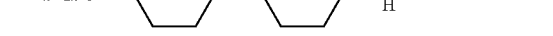

(4-3)

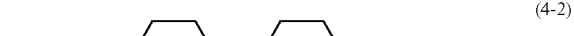

(4-4)

(wherein m and n are the same as or different from each other, and each represent an integer of 1 to 6.)

Specific examples of the liquid crystal compound containing an alkenyl group include a compound represented by the following Chemical formula (4-1-1).

[Chem. 9]

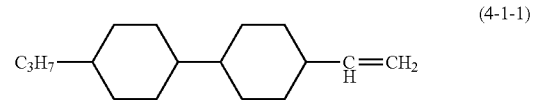

(4-1-1)

As shown in FIG. 2, the alignment control layer 50 is disposed in a region surrounded by the sealing member 40 in a plan view. The alignment control layer 50 is disposed so as to be in contact with the liquid crystal layer 30 and aligns the liquid crystal compound 31 in the liquid crystal material contained in the liquid crystal layer 30 in the direction horizontal to faces of the substrates 10 and 20. Alignment of the liquid crystal material in the condition that a voltage of a threshold or higher of the liquid crystal material is not applied to the liquid crystal layer 30 is controlled by the alignment control layer 50. Aligning the liquid crystal compound 31 in the liquid crystal material in the direction horizontal to faces of the substrates 10 and 20 means that a pre-tilt angle of the liquid crystal material with respect to faces of the substrates 10 and 20 is 10° or less. It is more preferred that the pre-tilt angle is 3° or less. The pre-tilt angle refers to an angle formed by a long axis of the liquid crystal material (liquid crystal compound 31) with respect to a face of substrate at an applied voltage to the liquid crystal layer 30 of less than the threshold voltage (including no application of voltage), and a face of substrate is 0°, and a normal of substrate is 90.

The alignment control layer 50 contains a polymer formed by polymerization of at least one monomer containing a monomer (the monomer (1)) represented by Chemical formula (1). Therefore, the alignment control layer 50 is a polymer layer containing a polymer including at least a unit derived from the monomer (1).

The monomer (1) has an azobenzene group. The azobenzene group is capable of expressing an alignment restraining force by absorbing polarized ultraviolet rays. Irradiation with polarized ultraviolet rays can lower the intensity of light irradiation applied to the liquid crystal layer 30, compared with irradiation with unpolarized light because light made up of only light in the monoaxial direction is applied. Expression of the alignment restraining force by the monomer (1) enables the alignment control layer 50 to align the liquid crystal compound 31 in the liquid crystal material in the direction horizontal to faces of substrates. Also, the monomer (1) has two polymerizable groups, and polymerizes by irradiation with light such as ultraviolet rays or heating to form a polymer. The phase of the polymer is separated from the liquid crystal layer 30, so that the alignment control layer 50 is formed.

Here, the reason why the monomer (1) is preferable will be described with reference to FIGS. 5 to 7. FIG. 5 is a chemical formula and schematic diagram showing a state in which the monomer having an azobenzene group according to Embodiment 1 is polymerized by irradiation with polarized ultraviolet rays. FIG. 6 is a schematic diagram showing a state in which a monomer having an azobenzene group according to Comparative Embodiment 1 is polymerized by irradiation with polarized ultraviolet rays. FIG. 7 is a schematic diagram showing a state in which a monomer having an azobenzene group according to Comparative Embodiment 2 is polymerized by irradiation with polarized ultraviolet rays. In order to perform alignment of azobenzene groups by absorption of polarized ultraviolet rays by the azobenzene groups and perform separation from the liquid crystal layer 30 by polymerization, the azobenzene groups in the alignment control layer 50 need to be aligned efficiently. To that end, (I) as shown in FIGS. 5 and 6, it is better to use a methacrylic group than an acrylic group. As shown in FIG. 6, when there is no methyl group in the main chain and an acrylic group is bonded, the acrylic group has high flexibility, so that flexibility of the main chain increases, and the arrangement state (orientation) of the azobenzene group is reduced as polymerization proceeds. As a result, the liquid crystal orientation is lowered. At the same time, it is preferable to use an ester group having good rigidity for a spacer portion (2), When a flexible alkyl group is introduced into a spacer, as shown in FIG. 7, the arrangement state of the azobenzene group is lowered by the movement of the spacer. In addition, when the spacer portion is long, the orientation of the azobenzene group is lowered according to a change in the shape of the spacer. As a result of these, the liquid crystal orientation is lowered.

An amide group is also exemplified as a spacer other than the ester group. However, when an amide group is used, liquid crystal solubility of a monomer thereof is lowered. In the present embodiment, when an alignment film is not formed, it is necessary to dissolve the monomer in the liquid crystal material by about 1% by weight. However, when the amide group is introduced into the monomer having an azobenzene group, the solubility of a monomer thereof with respect to the liquid crystal material is lowered.

As described above, at least one hydrogen atom of the phenylene group (benzene ring) of the monomer (1) is the same or different, and may be substituted with a halogen atom (preferably a fluorine atom), a methyl group, an ethyl group, or a propyl group. All hydrogen atoms contained in the phenylene group (benzene ring) of the monomer (1) may not be substituted.

A polarizing plate (linear polarizer) 60 may be disposed on each of the pair of substrates 10 and 20 on the side opposite to the liquid crystal layer 30. The polarizing plate 60 is typically produced by adsorbing and aligning an anisotropic material such as an iodine complex exhibiting dichroism on a polyvinyl alcohol (PVA) film. Typically, a protective film such as a triacetyl cellulose film is laminated on both faces of the PVA film before practical application. Between the polarizing plate 60 and the pair of substrates 10 and 20, an optical film such as a phase difference film may be disposed.

As shown in FIGS. 1 and 3, in the liquid crystal display device of the present embodiment, the backlight 70 is disposed on the back face of the liquid crystal panel. The liquid crystal display device having such a configuration is generally called a transmissive liquid crystal display device. The backlight 70 is not limited as long as it emits light including visible light, and may emit light including only visible light, or may emit light including both visible light and ultraviolet light.

The liquid crystal display device of the present embodiment is made up of multiple members including an external circuit such as TCP (tape carrier package) or PCB (printed circuit board); an optical film such as a viewing angle extending film or a luminance improving film; and bezel (frame) besides the liquid crystal panel and the backlight 70, and a particular member may be incorporated into another member. In addition to the components described above, the liquid crystal display device may include any components that are usually used in the field of liquid crystal display devices. The additional components are therefore not described here.

The liquid crystal display device 100 may be in a transverse electric field display mode. Examples of the transverse electric field display mode include an IPS mode, an FFS mode, and an electrically controlled birefringence (ECB) mode.

In the FFS mode, for example, at least one of the substrate 10 or 20 is provided with a structure including a planar electrode, a slit electrode, and an insulating film disposed between the planar electrode and the slit electrode (FFS electrode structure), and an oblique electric field (fringe electric field) is formed in the liquid crystal layer 30. Typically, a slit electrode, an insulating film, and a planar electrode are disposed in sequence from a side of the liquid crystal layer 30. As the slit electrode, for example, the one having a linear opening as a slit, the entire periphery of the slit being surrounded by the electrode, or the one in a comb shape having multiple comb tooth parts in which a linear cut disposed between comb tooth parts constitutes a slit can be used.

In the IPS mode, for example, a pair of interdigitated electrodes are provided on at least either of the substrates 10 and 20, and a transverse electric field is formed in the liquid crystal layer 30. As the pair of interdigitated electrodes, for example, a pair of electrodes each having multiple comb tooth portions, and arranged in such a manner that the comb tooth portions mutually mesh with each other can be used.

In the ECB mode, for example, either one of the substrates 10 and 20 is provided with a pixel electrode, and the other of the substrates is provided with a counter electrode, and a liquid crystal material having positive anisotropy of dielectric constant is used. By the voltage applied between the pixel electrode and the counter electrode, the retardation of the liquid crystal material is varied, and thus transmission or non-transmission of light is controlled.

<Production Method for Liquid Crystal Display Device>

Next, a production method for a liquid crystal display device of the present embodiment is described, the production method for a liquid crystal display device of the present embodiment may include sealing a liquid crystal composition containing a liquid crystal material and at least one monomer between a pair of substrates bonded to each other by a sealing member to form a liquid crystal layer, and irradiating the liquid crystal layer with polarized ultraviolet rays to form an alignment control layer by polymerization of the at least one monomer between the liquid crystal layer and each of the pair of substrates. In this production method, the at least one monomer contains a monomer (monomer (1)) represented by Chemical formula (1), and the alignment control layer aligns a liquid crystal compound in the liquid crystal material in a direction horizontal to faces of the substrates.

Hereinafter, while the steps are described in more detail, the members are as described above, and thus the description thereof is omitted.

The production method for a liquid crystal display device of the present embodiment includes sealing a liquid crystal composition containing a liquid crystal material and at least one monomer between a pair of substrates that are bonded to each other by a sealing member to form a liquid crystal layer. From the viewpoint of reliably increasing the peel strength between a pair of substrates, the production method for a liquid crystal display device of the present embodiment preferably does not include forming an alignment film on a face of at least one (more preferably both) of the pair of substrates prior to forming a liquid crystal layer. In this case, the pair of substrates are bonded to each other in such a manner that each substrate is in direct contact with the sealing member without intervention by an alignment film. On the other hand, from the viewpoint of long-term reliability, the production method for a liquid crystal display device of the present embodiment may include forming an alignment film (polyimide-based alignment film) containing polyimide on a face of at least one of a pair of substrates before forming the liquid crystal layer. In this case, at least one of the pair of substrates and the sealing member are intervened by the polyimide-based alignment film, and the pair of substrates is bonded with intervention by a polyimide-based alignment film. The polyimide-based alignment film can be formed, for example, by applying an alignment film material containing polyamic acid or the like on a face of at least one of the pair of substrates, and conducting baking after making the solvent in the alignment film material volatilize by heating. Thereafter, before forming a liquid crystal layer, the polyimide-based alignment film may or may not undergo alignment treatment. Examples of the alignment treatment include photo-alignment treatment such as rubbing treatment and ultraviolet irradiation.

In the forming of a liquid crystal layer, the liquid crystal composition can be sealed in such a manner that the liquid crystal composition is sandwiched between the pair of substrates by the sealing member, and the sealing member may not be cured. Hardening of the sealing member may be carried out separately or at the same time with forming an alignment control layer as will be described later. As described above, the sealing member may be cured by light such as ultraviolet rays, or may be cured by heat, or may be cured by both light and heat.

The liquid crystal layer can be formed by filling the space between the pair of substrates with the liquid crystal composition, for example, by vacuum injection or one drop filling. When the vacuum injection is employed, a liquid crystal layer is formed by conducting application of the sealing member, pasting together of the pair of substrates, curing of the sealing member, injection of the liquid crystal composition, and sealing of the injection port in this order. When the one drop filling is employed, a liquid crystal layer is formed by conducting application of the sealing member, dropping of the liquid crystal composition, pasting together of the pair of substrates, and curing of the sealing member in this order.

As described above, the liquid crystal material may have a negative anisotropy of dielectric constant or may have a positive anisotropy of dielectric constant, and preferably has a positive anisotropy of dielectric constant. The liquid crystal material may contain the liquid crystal compound containing an alkenyl group, the liquid crystal compound (2) and/or the liquid crystal compound (3). The liquid crystal material may contain one or two or more of these liquid crystal compounds.

The at least one monomer contains a monomer represented by Chemical formula (1) (monomer (1)). The monomer (1) has an azobenzene group, and can absorb polarized ultraviolet rays to express the alignment restraining force. Irradiation with polarized ultraviolet rays can lower the intensity of light irradiation applied to the liquid crystal layer, compared with irradiation with unpolarized light because light made up of only light in the monoaxial direction is applied.

A content of the monomer (1) with respect to the liquid crystal composition is preferably 0.03% by weight or more and 5% by weight or less, more preferably 0.05% by weight or more and 4.5% by weight or less, still more preferably 0.1% by weight or more and 3% by weight or less. If the concentration of the monomer (1) is too low, the horizontal alignment of the liquid crystal compound may not be sufficiently controlled by the alignment control layer. If the concentration of the monomer (1) is too high, the long-term reliability may be reduced by the residual monomer (1).

The production method for a liquid crystal display device of the present embodiment includes irradiating the liquid crystal layer with polarized ultraviolet rays to form an alignment control layer by polymerization of the at least one monomer between the liquid crystal layer and each of the pair of substrates. The polarized ultraviolet rays are preferably linearly polarized ultraviolet rays, when the forming of an alignment film is not included, the alignment control layer is formed at an interface between the liquid crystal layer and each of the pair of substrates, and when the forming of a polyimide-based alignment film is included, the alignment control layer is formed at an interface between the liquid crystal layer and the substrate or the polyimide-based alignment film. When the polyimide-based alignment films are formed on both substrates, the alignment control layer is formed at an interface between each polyimide-based alignment film and the liquid crystal layer. When the polyimide-based alignment film is formed only on one substrate, the alignment control layer is formed at an interface between the polyimide-based alignment film and the liquid crystal layer and at an interface between the substrate on which the polyimide-based alignment film is not formed and the liquid crystal layer.

The polarized ultraviolet rays may have a wavelength of 200 nm or more and 430 nm or less. A more preferred lower limit of the wavelength is 250 nm, and a more preferred upper limit is 380 nm. The dose of the polarized ultraviolet rays may be 0.3 J/cm$^2$ or more and 20 J/cm$^2$ or less. A more preferred lower limit of the dose is 1 J/cm$^2$, and a more preferred upper limit is 5 J/cm$^2$.

In the forming of an alignment control layer, polarized ultraviolet rays may be applied while the liquid crystal layer is heated at a temperature of a nematic phase-isotropic phase transition point of the liquid crystal material or higher, and 140° C. or lower. FIG. 8 is a schematic diagram showing the course of forming an alignment control layer in a production method for the liquid crystal display device of Embodiment 1. FIG. 8(a) shows monomers before polymerization, and FIG. 3(b) shows monomers after polymerization. In FIG. 8(a), the arrow indicates polarized ultraviolet rays. As illustrated in FIG. 8(a), polarized ultraviolet rays are applied while the liquid crystal layer 30 containing the liquid crystal material containing the liquid crystal compound 31 and at least, one monomer is heated. This results in polymerization of the at least one monomer and generation of a polymer. Phase separation of the polymer from the liquid crystal layer results in formation of the alignment control layer 50 between the liquid crystal layer and each of the pair of substrates as shown in FIG. 8(b).

By heating the liquid crystal layer 30 at a temperature of a nematic phase-isotropic phase transition point ($T_{NI}$) of the liquid crystal material or higher, it is possible to prevent the condition of the applied polarized ultraviolet rays from changing by the liquid crystal material in the liquid crystal layer, and thus it is possible to produce a liquid crystal display device having a high degree of alignment (high contrast ratio). It is preferred that the heating temperature is higher than the nematic phase-isotropic phase transition point of the liquid crystal material by 3° C. or more. The upper limit of the heating temperature is, for example, 140° C. from the view point of suppressing the thermal deterioration in the liquid crystal material as such as possible. The conditions including heating time and heating means are not limited. The nematic phase-isotropic phase transition point of the liquid crystal material can be measured, for example, by the differential scanning calorimetry (DSC), or by a method of enclosing the liquid crystal material in a capillary and directly observing the temperature dependence.

By having the forming of an alignment control layer after the forming of a liquid crystal layer, the pair of substrates sandwiching the liquid crystal layer are bonded to each other by the sealing member, and an alignment control layer can be formed in a region surrounded by the sealing member in a plan view. Also, by polymerizing the monomer (1) as a monomer for forming an alignment control layer, it is possible to form an alignment control layer that aligns the liquid crystal material in the direction horizontal to faces of the substrates.

The above steps are followed by the pasting of a polarizing plate, and the attaching of a controlling unit, a power unit, a backlight and so on to complete the liquid crystal display device of the present embodiment.

When the liquid crystal display device is in a normally black mode, for example, a pair of polarizing plates are arranged on the outer sides of the pair of substrates in a crossed Nicols relationship so that the absorption axes intersect each other at right angles, and the polarizing plates are arranged so that the absorption axis of the pair of polarizing plates and the irradiation axis of the polarized ultraviolet rays form an angle of 0° or 90°. In the condition that a voltage of a threshold or higher is not applied to the liquid crystal layer, the light from the backlight fails to transmit through the liquid crystal layer to give a black state. As a voltage of a threshold or higher is applied to the liquid crystal layer, the angle formed by the absorption axis of the pair of polarizing plates arranged in a crossed Nicols relationship, and the irradiation axis becomes, for example, 45°, so that the light from the backlight transmits through the liquid crystal layer to give a white state. The irradiation axis is a direction of oscillation of the polarized ultraviolet rays. By changing the irradiation direction of the polarized ultraviolet rays with respect to the substrates, it is possible to carry out an alignment dividing treatment.

The liquid crystal display device 100 is preferably in a transverse electric field display mode. Examples of the transverse electric field display mode include an IPS mode, an FFS mode, and an electrically controlled birefringence (ECB) mode.

Each and every detail described for Embodiments of the present invention shall be applied to all the aspects of the present invention.

The present invention is described below in more detail based on examples and comparative examples. The examples, however, are not intended to limit the scope of the present invention.

EXAMPLE 1-1

(Preparation of Liquid Crystal Composition)
1.0% by weight of the monomer represented by chemical formula (1) as a monomer for forming an alignment control layer was added to a positive liquid crystal material which contains a liquid crystal compound having positive anisotropy of dielectric constant and having a skeleton represented by the following Chemical formula (2-a) and a liquid crystal compound having positive anisotropy of dielectric constant and having a skeleton represented by the following Chemical formula (3-a) and has positive anisotropy of dielectric constant ($\Delta\varepsilon=8$) and a liquid crystal phase-isotropic phase transition point ($T_{NI}$) of 85° C., and then the resultant mixture was subjected to ultrasonic treatment for 3 minutes, and then left to stand in an environment at 25° C. for 24 hours to completely dissolve the monomer in the liquid crystal material.

[Chem. 10]

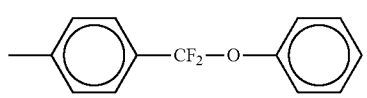

(2-a)

[Chem. 11]

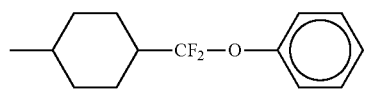

(3-a)

(Production of Liquid Crystal Panel)
A liquid crystal panel in FFS mode was actually prepared in the following manner. First, an indium tin oxide (ITO) substrate in which a pixel electrode having an FFS electrode structure made of ITO, an insulating film and a common electrode are laminated, and a counter substrate not having an electrode were prepared. A sealing member (Photolec available from Sekisui Chemical Co., Ltd.) was applied to the ITO substrate, and the liquid crystal composition obtained in the above was dropped in a region surrounded by the sealing member, and then the counter substrate was pasted together to prepare a liquid crystal panel.

Subsequently, the liquid crystal panel was irradiated with linear polarized ultraviolet rays (wavelength of 300 to 380 nm) from the normal direction to the liquid crystal panel at 10 mW/cm$^2$ for 100 seconds (1 J/cm$^2$) by using an extra-high pressure mercury lamp (available from USHIO INC.) while the liquid crystal panel was heated to a temperature of $T_{NI}$ (95° C.) or higher, and thus an alignment control layer was formed and the sealing member was cured. The sealing member after curing had a width of 0.5 mm. Thereafter, the temperature of the liquid crystal panel was returned to room temperature to prepare a liquid crystal panel in FFS mode not having an alignment film.

EXAMPLE 1-2

A liquid crystal panel of Example 1-2 was prepared in the same manner as in Example 1-1 except that in the forming of an alignment control layer, linear polarized ultraviolet rays were applied at 10 mW/cm$^2$ for 200 seconds (2 J/cm$^2$).

COMPARATIVE EXAMPLE 1

A liquid crystal panel of Comparative Example 1 was prepared in the same manner as in Example 1-1 except that in the forming of an alignment control layer, linear polarized ultraviolet rays were not applied.

COMPARATIVE EXAMPLE 2

1.0% by weight of the monomer represented by Chemical formula (1) as a monomer for forming an alignment control layer was added to a liquid crystal material which contains a liquid crystal compound having negative anisotropy of dielectric constant and has negative anisotropy of dielectric constant ($\Delta\varepsilon=-3$) and a liquid crystal phase-isotropic phase transition point ($T_{NI}$ of 85° C., and then the resultant mixture was subjected to ultrasonic treatment for 3 minutes, and then left to stand in an environment at 25° C. for 24 hours. However, the monomer did not dissolve, and the solid content was confirmed in the liquid crystal material. In order to dissolve the monomer, the monomer was heated to 100° C. ($T_{NI}$ or higher) and allowed to stand for 60 minutes. However, the monomer precipitated again when the temperature returned to room temperature.

<Measurement of Light Transmissive Intensity>
Light transmissive intensity in the black state and light transmissive intensity in a light transmissive state were measured for each liquid crystal panel in FFS mode prepared in Examples 1-1 and 1-2 and Comparative Example 1. On both sides of each liquid crystal panel, a pair of polarizing plates were arranged in a crossed Nicols relationship so that the absorption axes intersect each other at right angles, and the polarizing plates were arranged so that the angle formed by the absorption axis of the polarizing plates and the irradiation axis of the polarized ultraviolet rays was 0° or 90°, and light transmissive intensity in the black state was measured. Then, the pair of polarizing plates arranged in a crossed Nicols relationship were arranged so that the angle formed by the absorption axis of the pair of polarizing plates and the irradiation axis of the polarized ultraviolet rays was 45°, and light transmissive intensity in the light transmissive state was measured. From the obtained light transmissive intensity, a transmittance ratio was calculated by the following equation (1). As a result, the transmittance ratios of Examples 1-1 and 1-2 and Comparative Example 2 were 450, 670, and 1, respectively.

Transmittance ratio=Light transmissive intensity in black state/Light transmissive intensity in light transmissive state     (1)

The black state and the light transmissive state of Examples 1-1 and 1-2 and Comparative Example 1 were observed with a scanning electron microscope. FIG. 9 is a table summarizing results of observations of the black state and the light transmissive state of Examples 1-1 and 1-2 and Comparative Example 1. In FIG. 9, the solid double-pointed arrow indicates the absorption axis of the polarizing plates, and the dotted double-pointed arrow indicates the irradiation axis of the linear polarized ultraviolet rays.

These results showed that in Examples 1-1 and 1-2, a liquid crystal panel containing a liquid crystal composition in which the monomer represented by Chemical formula (1) was dissolved in a positive liquid crystal material was irradiated with polarized ultraviolet rays while the liquid crystal panel was heated at a temperature of $T_{NI}$ or higher, so that the alignment control layer was formed, and horizontal alignment could be controlled. Focusing on Examples 1-1 and 1-2, as shown in FIG. 9, when the angle formed by the absorption axis of the polarizing plates and the irradiation axis of the linear polarized ultraviolet rays was 0° or 90°, the light did not transmit through the liquid crystal panel, and the black state was presented. When the angle formed by the absorption axis of the polarizing plates and the irradiation axis of the linear polarized ultraviolet rays was 45°, the light transmitted through the liquid crystal panel.

On the other hand, in Comparative Example 1 in which linear polarized ultraviolet rays were not applied, there is little difference in light transmissive intensity between the black state and the light transmissive state, and alignment of the liquid crystal material was not observed.

Further, Example 1-2 in which the dose was 2 J/cm² shows a higher transmittance ratio, and less voids of light in black state than Example 1-1 in which the dose was 1 J/cm². As a result, it has been confirmed that the horizontal orientation improves by increasing the dose.

COMPARATIVE EXAMPLE 3

A liquid crystal panel in FFS mode was produced in the same manner as in Example 1-1 except for the following points. In this comparative example, a polyimide-based horizontal alignment film was formed on an ITO substrate and a counter substrate, and rubbing treatment was performed. The liquid crystal material used in this comparative example was the same as the positive liquid crystal material ($T_{NI}$=85° C.) used in Example 1-1, except that the monomer represented by Chemical formula (1) was not added. In this comparative example, the liquid crystal panel was heated to a temperature of $T_{NI}$ (95° C.) or higher to cure the sealing member; however, irradiation with linearly polarized ultraviolet rays was not performed.

<Characteristic Evaluation 1>

The liquid crystal panels in FFS mode produced in Example 1-2 and Comparative Example 3 were evaluated for the following characteristics.

(Contrast)

First, VT characteristics were measured by using Photal 5200 (available from OTSUKA ELECTRONICS Co., LTD.). FIG. 10 is a graph showing VT characteristics of Example 1-2 and Comparative Example 3. In FIG. 10, the solid line indicates Example 1-2, and the dotted line indicates Comparative Example 3. Contrast was calculated by the transmittance ratio between the applied voltage 4 V (white voltage) and the applied voltage 0 V (black voltage). In each graph showing the VT characteristics, the horizontal axis represents the voltage (V), the vertical axis represents the transmittance (a.u.), and a change in transmittance with respect to the voltage applied to the liquid crystal layer is shown.

(Response Characteristics)

By using Photal 5200 (available from OTSUKA ELECTRONICS Co., LTD.), response speeds (rise time τr) and fall time (τd)) were measured between with a voltage of 0.5 V applied and with a voltage (4 V) applied where the transmittance was maximum.

(Backlight Exposure Test)

A backlight exposure test was performed in which a liquid crystal panel was placed on an illuminating LED backlight and was left at a temperature of 30° C. for 100 hours. The voltage holding ratio (VHR) before and after the exposure test was measured. The VHR was measured conditions of 1 V and 70° C. using a 6254 type VHR measurement system manufactured by Toyo Corporation. The contrast and response characteristics were measured before the exposure test (initial stage). The obtained results are shown in Table 1 below.

TABLE 1

|  | Monomer | Alignment film | Contrast ratio | Initial stage (0 hour) Response (ms) | Initial stage (0 hour) VHR (%) | 100 hours VHR (%) |
|---|---|---|---|---|---|---|
| Example 1-2 | Monomer (1) 1.0 wt % (Irradiation with polarized UV rays 2 J/cm²) | None | 670 | τ r = 11.5 τ d = 12.4 | 98.9 | 97.7 |

TABLE 1-continued

| | Monomer | Alignment film | Initial stage (0 hour) | | | 100 hours |
| | | | Contrast ratio | Response (ms) | VHR (%) | VHR (%) |
|---|---|---|---|---|---|---|
| Comparative Example 3 | None | Polyimide-based horizontal alignment film (Rubbing treatment) | 670 | τ r = 11.8 τ d = 12.2 | 98.7 | 97.7 |

There was no difference in the contrast, response characteristics and VT characteristics between Example 1-2 (alignment film-less cell) and Comparative Example 3 (the polyimide-based alignment film was used), and it was confirmed that a sufficient level of orientation and electro-optical characteristics were exhibited by irradiating the monomer represented by Chemical formula (1) with polarized ultraviolet rays in a positive liquid crystal material.

Similarly, there was no difference in VHR at the initial stage and after 100 hours between Example 1-2 (alignment film-less cell) and Comparative Example 3 (the polyimide-based alignment film was used), and it was shown that even when the monomer represented by Chemical formula (1) was irradiated with polarized ultraviolet rays in a positive liquid crystal material, a sufficient level of reliability was obtained.

EXAMPLE 2

(Preparation of Liquid Crystal Composition)

1.2% by weight of the monomer represented by Chemical formula (1) as a monomer for forming an alignment control layer was added to a positive liquid crystal material which contains a liquid crystal compound having positive anisotropy of dielectric constant and having a skeleton represented by Chemical formula (2-a), a liquid crystal compound having positive anisotropy of dielectric constant and having a skeleton represented by Chemical formula (3-a) and a liquid crystal compound having anisotropy of dielectric constant of substantially 0 and having an alkenyl group and has positive anisotropy of dielectric constant ($\Delta\varepsilon=3$) and a liquid crystal phase-isotropic phase transition point ($T_{NI}$) of 95° C., and then the resultant mixture was subjected to ultrasonic treatment for 3 minutes, and then left to stand in an environment at 25° C. for 24 hours to completely dissolve the monomer in the liquid crystal material.

(Production of Liquid Crystal Panel)

A liquid crystal panel in FFS mode was actually prepared in the following manner. First, an ITO substrate in which a pixel electrode having an FFS electrode structure made of indium tin oxide, an insulating film and a common electrode are laminated, and a counter substrate not having an electrode were prepared. A sealing member (Photolec available from Sekisui Chemical Co., Ltd.) was applied to the ITO substrate, and the liquid crystal composition obtained in the above was dropped in a region surrounded by the sealing member, and then the counter substrate was pasted together to prepare a liquid crystal panel.

Subsequently, the liquid crystal panel was irradiated with linear polarized ultraviolet rays (wavelength of 300 to 380 nm) from the normal direction to the liquid crystal panel at 10 mW/cm$^2$ for 200 seconds (2 J/cm$^2$) by using an extra-high pressure mercury lamp (available from USHIO INC.) while the liquid crystal panel was heated to a temperature of $T_{NI}$ (105° C.) or higher, and thus an alignment control layer was formed and the sealing member was cured. The sealing member after curing had a width of 0.5 mm. Thereafter, the temperature of the liquid crystal panel was returned to room temperature to prepare a liquid crystal panel in FFS mode not having an alignment film.

COMPARATIVE EXAMPLE 4

1.2% by weight of the monomer represented by Chemical formula (1) as a monomer for forming an alignment control layer was added to a liquid crystal material which contains a liquid crystal compound having negative anisotropy of dielectric constant and has negative anisotropy of dielectric constant ($\Delta\varepsilon=-2.5$) and a liquid crystal phase-isotropic phase transition point ($T_{NI}$) of 90° C., and then the resultant mixture was subjected to ultrasonic treatment for 3 minutes, and then left to stand in an environment at 25° C. for 24 hours. However, the monomer did not dissolve, and the solid content was confirmed in the liquid crystal material. In order to dissolve the monomer, the monomer was heated to 100° C. ($T_{NI}$ or higher) and allowed to stand for 60 minutes. However, the monomer precipitated again when the temperature returned to room temperature.

COMPARATIVE EXAMPLE 5

A liquid crystal panel in FFS mode was produced in the same manner as in Example 2 except for the following points. In this comparative example, a polyimide-based horizontal alignment film was formed on an ITO substrate and a counter substrate, and rubbing treatment was performed. The liquid crystal material used in this comparative example was the same as the positive liquid crystal material ($T_{NI}=95°$ C.) used in Example 2, except that the monomer represented by Chemical formula (1) was not added. In this comparative example, the liquid crystal panel was heated to a temperature of $T_{NI}$ (105° C.) or higher to cure the sealing member; however, irradiation with linearly polarized ultraviolet rays was not performed.

CHARACTERISTIC EVALUATION 2

The liquid crystal panels in FFS mode produced in Example 2 and Comparative Example 5 were evaluated for the characteristics as described above in the same manner as in Example 1-2 and Comparative Example 3. FIG. 11 is a graph showing VT characteristics of Example 2 and Comparative Example 5. In FIG. 11, the solid line indicates Example 2, and the dotted line indicates Comparative Example 5. Contrast was calculated by the transmittance ratio between the applied voltage 6.3 V (white voltage) and the applied voltage 0 V (black voltage). The response speeds (τr and τd) were measured between with a voltage of 0.5 V applied and with a voltage (6.3 V) applied where the transmittance was maximum. The obtained results are shown in Table 2 below.

TABLE 2

|  | Monomer | Alignment film | Contrast ratio | Initial stage (0 hour) Response (ms) | VHR (%) | 100 hours VHR (%) |
|---|---|---|---|---|---|---|
| Example 2 | Monomer (1) 1.2 wt % (Irradiation with polarized UV rays 2 J/cm$^2$) | None | 740 | τr = 10.0 τd = 10.2 | 99.3 | 99.2 |
| Comparative Example 5 | None | Polyimide-based horizontal alignment film (Rubbing treatment) | 740 | τr = 9.7 τd = 10.4 | 99.4 | 99.4 |

There was no difference in the contrast, response characteristics and VT characteristics between Example 2 (alignment film-less cell) and Comparative Example 5 (the polyimide-based alignment film was used), and it was confirmed that a sufficient level of orientation and electro-optical characteristics were exhibited by irradiating the monomer represented by Chemical formula (1) with polarized ultraviolet rays in the positive liquid crystal material.

Similarly, there was no difference in the VHR at the initial stage and after 100 hours between Example 2 (alignment film-less cell) and Comparative Example 5 (the polyimide-based alignment film was used), and a very high value of 99% or more was obtained. Therefore, it was shown that even when the monomer represented by Chemical formula (1) was irradiated with polarized ultraviolet rays in a positive liquid crystal material, a sufficient level of reliability was obtained.

EXAMPLE 3

(Preparation of Liquid Crystal Composition 1.2% by weight of the monomer represented by Chemical formula (1) as a monomer for forming an alignment control layer was added to the same positive liquid crystal material as in Example 2, and then the resultant mixture was subjected to ultrasonic treatment for 3 minutes, and then left to stand in an environment at 25° C. for 24 hours to completely dissolve the monomer in the liquid crystal material.

(Production of Liquid Crystal Panel)

A liquid crystal panel in FFS mode was actually prepared in the following manner. First, an ITO substrate in which a pixel electrode having an FFS electrode structure made of indium tin oxide, an insulating film and a common electrode are laminated, and a counter substrate not having an electrode were prepared. After forming an alignment film from a polyimide-based alignment film material on both substrates, alignment treatment (rubbing or the like) was not performed. This alignment film could not align the liquid crystal compound uniformly.

Subsequently, a sealing member (Photolec available from Sekisui Chemical Co., Ltd.) was applied onto an alignment film of the ITO substrate, and the liquid crystal composition obtained in the above was dropped in a region surrounded by the sealing member, and then the counter substrate was pasted together to prepare a liquid crystal panel. The sealing member was also in contact with the alignment film of the counter substrate.

Subsequently, the liquid crystal panel was irradiated with linear polarized ultraviolet rays (wavelength of 300 to 380 nm) from the normal direction to the liquid crystal panel at 10 mW/cm$^2$ for 200 seconds (2 J/cm$^2$) by using an extra-high pressure mercury lamp (available from USHIO INC.) while the liquid crystal panel was heated to a temperature of $T_{NI}$ (105° C.) or higher, and thus an alignment control layer was formed and the sealing member was cured. The sealing member after curing had a width of 0.9 mm. Thereafter, the temperature of the liquid crystal panel was returned to room temperature to prepare a liquid crystal panel in FFS mode not having an alignment film.

<Characteristic Evaluation 3>

The liquid crystal panel in FFS mode produced in Example 3 was evaluated for the characteristics as described above in the same manner as in Example 1-2 and Comparative Example 3. FIG. 12 is a graph showing VT characteristics of Example 2 and Example 3. Contrast was calculated by the transmittance ratio between the applied voltage 6.3 V (white voltage) and the applied voltage 0 V (black voltage). The response speeds (τr and τd) were measured between with a voltage of 0.5 V applied and with a voltage (6.3 V) applied where the transmittance was maximum. In FIG. 11, the solid line indicates Example 2, and the dotted line indicates Example 3. The obtained results are shown in Table 3 below.

TABLE 3

|  | Monomer | Alignment film | Contrast ratio | Initial stage (0 hour) Response (ms) | VHR (%) | 100 hours VHR (%) |
|---|---|---|---|---|---|---|
| Example 3 | Monomer (1) 1.2 wt % (Irradiation with polarized UV rays 2 J/cm$^2$) | None | 750 | τr = 10.1 τd = 9.9 | 99.5 | 99.4 |

In Example 3 having a polyimide-based alignment film that has not been subjected to alignment treatment and having an alignment control layer formed by polymerization of the monomer represented by Chemical formula (1), the contrast, response characteristics, and VT characteristics were equivalent to Example 2 (alignment film-less cell), and it was confirmed that even when a polyimide-based alignment film not subjected to alignment treatment was provided, a sufficient level of orientation and electro-optical characteristics were exhibited by irradiating the monomer represented by Chemical formula (1) with polarized ultraviolet rays in a positive liquid crystal material.

Similarly, since the VHR at the initial stage and the VHR after 100 hours were slightly higher than those of Example 2 (alignment film-less cell), it was shown that even when a polyimide-based alignment film not subjected to alignment treatment was provided, a sufficient level of reliability was obtained.

From the above, it was confirmed that a liquid crystal display device in FFS mode could be produced by using a monomer represented by Chemical formula (1). Since the horizontal alignment of the monomer can be controlled, liquid crystal display devices in IPS mode and ECB mode which are transverse electric field display modes are also applicable.

PRODUCTION EXAMPLE 1

Two non-acryl glass substrates of 13 mm long and 35 mm wide (hereinafter, glass plates) were prepared, and a sealing member (Photolec available from Sekisui Chemical Co., Ltd.) was dropped on one of the glass plates so that the diameter was 2 mm without formation of an alignment film, and the other of the glass plates was pasted together crosswise in such a manner that the longitudinal directions intersect at right angles. Then after irradiation with ultraviolet rays, heating was conducted to cure the sealing member, and thus a sample for evaluation of adhesive strength was prepared as shown in FIG. 13 to complete Production Example 1. FIG. 13 is a schematic view of a sample for evaluation of adhesive strength.

PRODUCTION EXAMPLE 2

Two glass plates of 13 mm long and 35 mm wide were prepared, and an alignment film composition containing polyamic acid of horizontal alignment type was applied on a face of each of the glass plates. Then, baking at 200° C. for 40 minutes was conducted to form a polyimide horizontal alignment film (rubbing alignment film) on the faces of the glass plates. Thereafter, rubbing treatment was not applied to any polyimide-based horizontal alignment film, and the two glass plates were pasted together in the same manner as in Production Example 1, and the sealing member was cured to prepare Production Example 2.

PRODUCTION EXAMPLE 3

Two glass plates of 13 mm long and 35 mm wide were prepared, and an alignment film composition containing polyamic acid of horizontal photo-alignment type was applied on a face of each of the glass plates. Then, baking at 200° C. for 40 minutes was conducted to form a polyimide-based horizontal photo-alignment film on the faces of the glass plates. Thereafter, photo-alignment treatment was not applied to any polyimide-based horizontal photo-alignment film, and the two glass plates were pasted together in the same manner as in Production Example 1, and the sealing member was cured to prepare Production Example 3.

<Adhesive Strength Test>

An aging test in a high temperature and high humidity environment was conducted by placing each of Production Examples 1, 2 and 3 on an illuminating backlight, and leaving to stand at a temperature of 60° C., at a humidity of 90% for 100 hours. Thereafter, adhesive strength before and after the high temperature and high humidity test was measured. Regarding the adhesive strength, as shown in FIG. 13, a load was applied on either one of the two glass plates that were pasted together crosswise (the arrow outline with a blank inside), and an adhesive strength was measured when either of the glass plates and the sealing member peeled off from each other. The obtained results are shown in Table 4 below.

TABLE 4

| | Type of alignment film | Adhesive strength before high temperature and high humidity test (kgf/mm) | Adhesive strength after high temperature and high humidity test (kgf/mm) |
| --- | --- | --- | --- |
| Production Example 1 | None | 2.8 | 2.8 |
| Production Example 2 | Polyimide-based horizontal alignment film | 2.6 | 1.5 |
| Production Example 3 | Polyimide-based horizontal photo-alignment film | 1 | 0.2 or lower |

Referring to the results in Table 4, Production Example 2 in which a polyimide horizontal alignment film (rubbing alignment film) was formed showed an initial adhesive strength of 2.6 kgf/mm, which was comparable with the adhesive strength (2.8 kgf/mm) of Production Example 1 in which an alignment film was not formed, whereas, the adhesive strength after the high temperature and high humidity test in Production Example 2 significantly deteriorated to 1.5 kgf/mm. In Production Example 3 in which a polyimide-based horizontal photo-alignment film was formed, the initial adhesive strength was 1.0 kgf/mm, which was lower than those in Production Examples 1 and 2. The adhesive strength after the high temperature and high humidity test of Production Example 3 further deteriorated to 0.2 kgf/mm or less. In Production Example 1 in which an alignment film was not formed, the initial adhesive strength was as high as 2.8 kgf/mm, and the adhesive strength did not deteriorate and kept a value as high as 2.8 kgf/mm even after the high temperature and high humidity test. These results demonstrated that it is effective to use a substrate not having a conventional alignment film (horizontal alignment film or vertical alignment film) as a substrate for a liquid crystal display device in order to keep high adhesive strength even when the width of the sealing member is narrowed due to narrowing of frame.

[Additional Remarks]

One aspect of the present invention may be a liquid crystal display device including a liquid crystal layer containing a liquid crystal material, a sealing member surrounding the liquid crystal layer in a plan view, a pair of substrates sandwiching the liquid crystal layer, and an alignment control layer being in contact with the liquid crystal layer in a region surrounded by the sealing member in a plan view. In this liquid crystal display device, the alignment control layer aligns a liquid crystal compound in the liquid crystal material in a direction horizontal to faces of the substrates, and contains a polymer formed by polymerization of at least one monomer, and the at least one monomer contains a monomer represented by the following Chemical formula (1). The liquid crystal display device can have high peel strength between substrates because the pair of substrates can be bonded to each other by a sealing member without a conventional alignment film interposed therebetween. Since the monomer (monomer (1)) represented by the following Chemical formula (1) has an azobenzene group, and is capable of absorbing the polarized ultraviolet rays to express the alignment restraining force, the intensity of light irradiation applied to the liquid crystal layer can be made lower compared with irradiation with unpolarized light.

[Chem. 12]

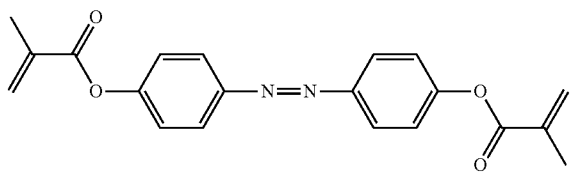

(1)

(wherein at least one hydrogen atom of the phenylene group may be the same or different and may be substituted with a halogen atom, a methyl group, an ethyl group, or a propyl group.)

In one aspect of the present invention, the liquid crystal material may have positive anisotropy of dielectric constant. Thereby, a liquid crystal compound including a structure represented by the following Chemical formula (2) or (3) can be easily used.

In one aspect of the present invention, the liquid crystal material may contain at least one of a liquid crystal compound including a structure represented by the following Chemical formula (2) or a liquid crystal compound including a structure represented by the following Chemical formula (3). Thereby, the solubility of the monomer (1) in the liquid crystal material can be improved.

[Chem. 13]

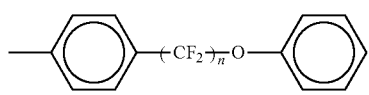

(2)

(wherein at least one hydrogen atom of a benzene ring may be substituted with a halogen atom, and n is an integer of 1 to 3.)

[Chem. 14]

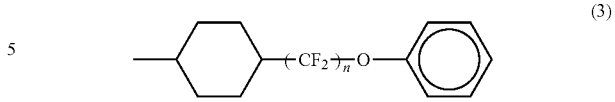

(3)

(wherein at least one hydrogen atom of the benzene ring and the cyclohexane ring may be substituted with a halogen atom, and n is an integer of 1 to 3.)

In one aspect of the present invention, a liquid crystal compound including a structure represented by Chemical formula (2) may be a compound represented by any one of the following Chemical formulas (2-1) to (2-3), and a liquid crystal compound including a structure represented by Chemical formula (3) may be a compound represented by any one of the following Chemical formulas (3-1) to (3-4).

[Chem. 15]

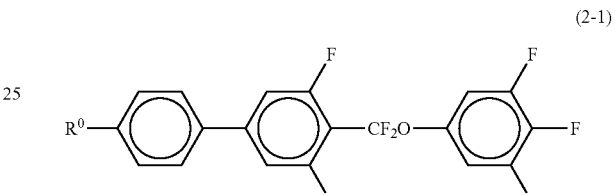

(2-1)

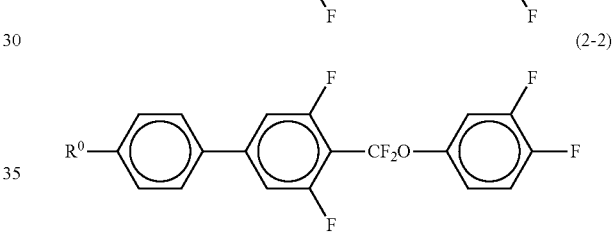

(2-2)

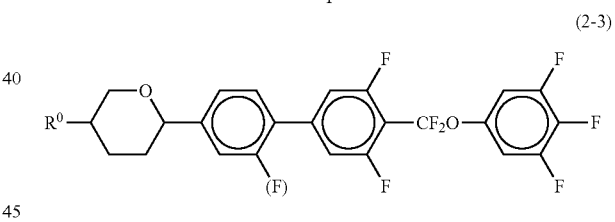

(2-3)

(wherein $R^0$ is a saturated alkyl group containing 1 to 12 carbon atoms.)

[Chem. 16]

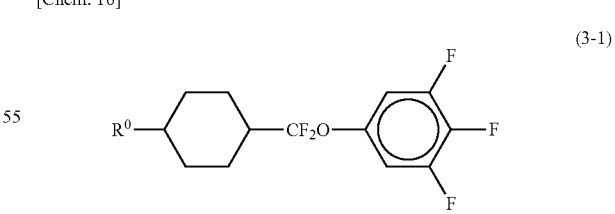

(3-1)

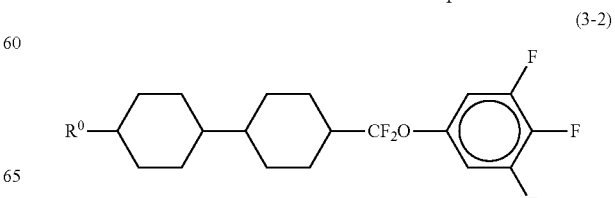

(3-2)

-continued (3-3)
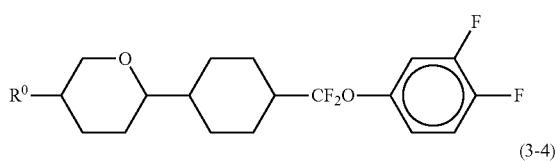

(3-4)
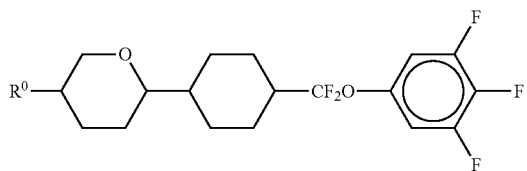

(wherein $R^0$ is a saturated alkyl group containing 1 to 12 carbon atoms.)

In one aspect of the present invention, the liquid crystal material may contain a liquid crystal compound containing an alkenyl group. By containing a liquid crystal compound containing an alkenyl group, it is possible to improve the responsibility of the liquid crystal material, and to improve the speed.

In one aspect of the present invention, the liquid crystal compound containing an alkenyl group may be a compound represented by any one of the following Chemical formulas (4-1) to (4-4).

[Chem. 17]

(4-1)
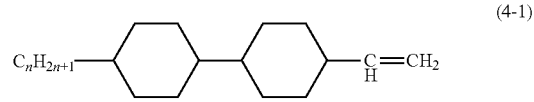

(4-2)
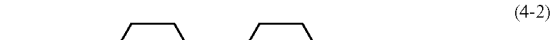

(4-3)
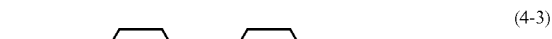

(4-4)

(wherein m and n are the same as or different from each other, and each represent an integer of 1 to 6.)

In one aspect of the present invention, the liquid crystal display device may include an alignment film that is provided between the alignment control layer and at least one of the pair of substrates and contains polyimide.

In one aspect of the present invention, the liquid crystal display device may be in a transverse electric field display mode.

Another aspect of the present invention may be a production method for a liquid crystal display device, including sealing a liquid crystal composition containing a liquid crystal material and at least one monomer between a pair of substrates bonded to each other by a sealing member to form a liquid crystal layer, and irradiating the liquid crystal layer with polarized ultraviolet rays to form an alignment control layer by polymerization of the at least one monomer between the liquid crystal layer and each of the pair of substrates. In this production method, the at least one monomer contains a monomer represented by the following Chemical formula (1), and the alignment, control layer aligns a liquid crystal compound in the liquid crystal material in a direction horizontal to faces of the substrates,

[Chem. 18]

(1)
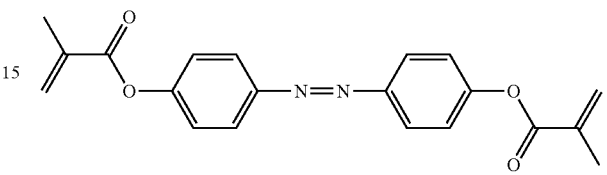

(wherein at least one hydrogen atom of the phenylene group may be the same or different and may be substituted with a halogen atom, a methyl group, an ethyl group, or a propyl group.)

In one aspect of the present invention, the liquid crystal material may have positive anisotropy of dielectric constant. Thereby, a liquid crystal compound including a structure represented by Chemical formula (2) or (3) can be easily used.

In one aspect of the present invention, the production method for a liquid crystal display device may further include forming an alignment film containing polyimide on at least one of the pair of substrates.

In another aspect of the present invention, in the forming of an alignment control layer, polarized ultraviolet rays may be applied while the liquid crystal layer is heated at a temperature of a nematic phase-isotropic phase transition point of the liquid crystal material or higher, and 140° C. or lower.

The embodiments of the present invention shown above may be combined as appropriate within the spirit of the present invention.

REFERENCE SIGNS LIST

10, 20 substrate
11, 21 transparent substrate
12 black matrix
13 color filter
14 overcoat layer
22 common electrode
23 insulating layer
24 pixel electrode
30 liquid crystal layer
31 liquid crystal compound (liquid crystal molecule)
40 sealing member
50 alignment control layer
60 polarizing plate
70 backlight
80 alignment film
100 liquid crystal display device

The invention claimed is:
1. A liquid crystal display device comprising:
a liquid crystal layer containing a liquid crystal material;
a sealing member surrounding the liquid crystal layer in a plan view;

a pair of substrates sandwiching the liquid crystal layer; and an alignment control layer being in contact with the liquid crystal layer in a region surrounded by the sealing member in a plan view, the alignment control layer aligning a liquid crystal compound in the liquid crystal material in a direction horizontal to faces of the substrates, and containing a polymer formed by polymerization of at least one monomer, and the at least one monomer including a monomer represented by Chemical formula (1):

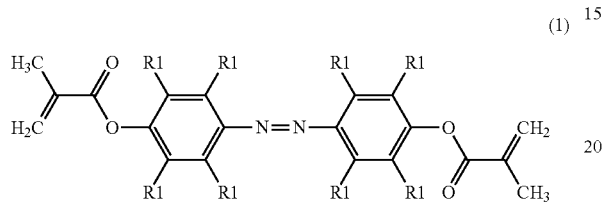
(1)

wherein each of R1 individually represents a hydrogen atom, a halogen atom, a methyl group, an ethyl group, or a propyl group.

2. The liquid crystal display device according to claim 1, wherein the liquid crystal material has positive anisotropy of dielectric constant.

3. The liquid crystal display device according to claim 1, wherein the liquid crystal material contains at least one of a liquid crystal compound including a structure represented by Chemical formula (2) or a liquid crystal compound including a structure represented by Chemical formula (3):

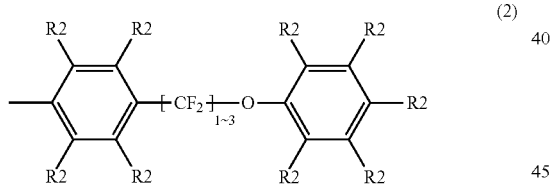
(2)

wherein each of R2 individually represents a hydrogen atom or a halogen atom,

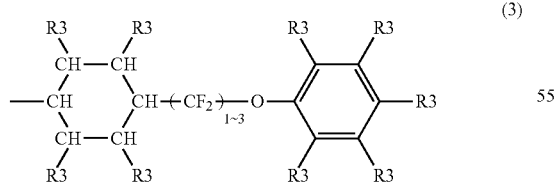
(3)

wherein each of R3 individually represents a hydrogen atom or a halogen atom.

4. The liquid crystal display device according to claim 3, wherein the liquid crystal compound including the structure represented by Chemical formula (2) is a compound represented by any one of Chemical formulas (2-1) to (2-4), and the liquid crystal compound including the structure represented by Chemical formula (3) is a compound represented by any one of Chemical formulas (3-1) to (3-4):

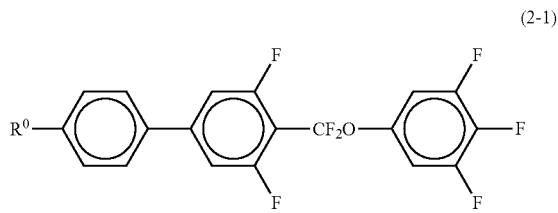
(2-1)

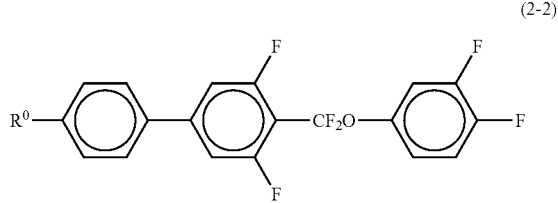
(2-2)

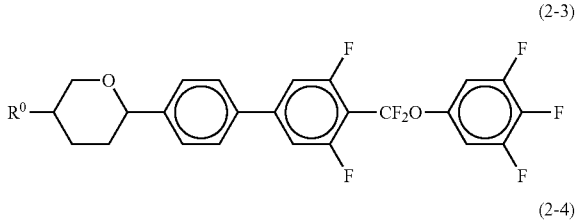
(2-3)

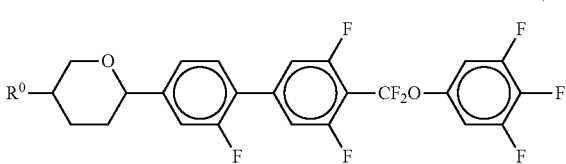
(2-4)

wherein $R^0$ is a saturated alkyl group containing 1 to 12 carbon atoms,

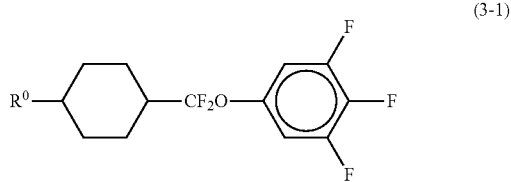
(3-1)

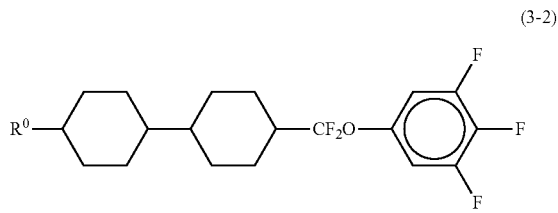
(3-2)

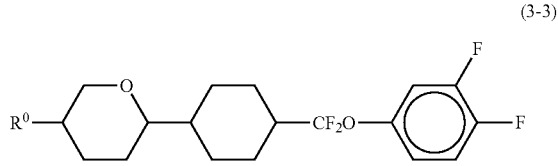
(3-3)

-continued (3-4)

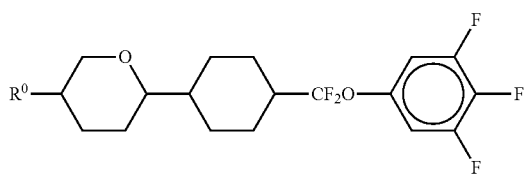

wherein R⁰ is a saturated alkyl group containing 1 to 12 carbon atoms.

5. The liquid crystal display device according to claim 1, wherein the liquid crystal material contains a liquid crystal compound containing an alkenyl group.

6. The liquid crystal display device according to claim 5, wherein the liquid crystal compound containing an alkenyl group is a compound represented by any one of Chemical formulas (4-1) to (4-4):

(4-1)

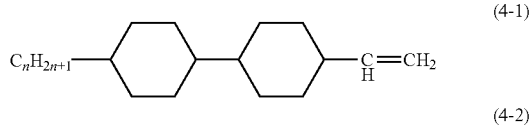

(4-2)

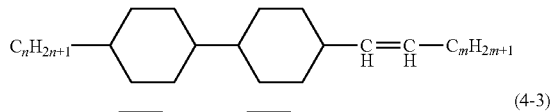

(4-3)

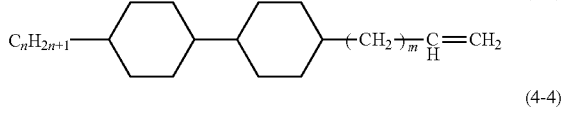

(4-4)

wherein m and n are the same as or different from each other, and each represent an integer of 1 to 6.

7. The liquid crystal display device according to claim 1, comprising an alignment film that is provided between the alignment control layer and at least one of the pair of substrates and contains polyimide.

8. The liquid crystal display device according to claim 1, being in a transverse electric field display mode.

9. A production method for a liquid crystal display device, comprising:
sealing a liquid crystal composition containing a liquid crystal material and at least one monomer between a pair of substrates bonded to each other by a sealing member to form a liquid crystal layer; and
irradiating the liquid crystal layer with a polarized ultraviolet ray to form an alignment control layer by polymerization of the at least one monomer between the liquid crystal layer and each of the pair of substrates,
the at least one monomer including a monomer represented by Chemical formula (1), and
the alignment control layer aligning a liquid crystal compound in the liquid crystal material in a direction horizontal to faces of the substrates:

(1)

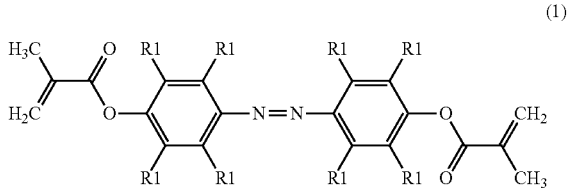

wherein each of R1 individually represents a hydrogen atom, a halogen atom, a methyl group, an ethyl group, or a propyl group.

10. The production method for a liquid crystal display device according to claim 9,
wherein the liquid crystal material has positive anisotropy of dielectric constant.

11. The production method for a liquid crystal display device according to claim 9, further comprising forming an alignment film containing polyimide on at least one of the pair of substrates.

12. The production method for a liquid crystal display device according to claim 9,
wherein in the forming of the alignment control layer, the polarized ultraviolet ray is applied while the liquid crystal layer is heated at a temperature of a nematic phase-isotropic phase transition point of the liquid crystal material or higher, and 140° C. or lower.

* * * * *